(12) United States Patent
Zheng et al.

(10) Patent No.: US 10,618,182 B2
(45) Date of Patent: Apr. 14, 2020

(54) UNDERACTUATED MECHANICAL FINGER CAPABLE OF LINEAR MOTION WITH COMPENSATORY DISPLACEMENT, MECHANICAL GRIPPER AND ROBOT CONTAINING THE SAME

(71) Applicants: Eric Y. Zheng, Holmdel, NJ (US); Wenzeng Zhang, Beijing (CN)

(72) Inventors: Eric Y. Zheng, Holmdel, NJ (US); Wenzeng Zhang, Beijing (CN)

( * ) Notice: Subject to any disclaimer, the term of this patent is extended or adjusted under 35 U.S.C. 154(b) by 0 days.

(21) Appl. No.: 15/831,346

(22) Filed: Dec. 4, 2017

(65) Prior Publication Data

US 2019/0176344 A1    Jun. 13, 2019

(51) Int. Cl.
*B25J 15/02*    (2006.01)
*B25J 9/10*    (2006.01)
*B25J 17/02*    (2006.01)
*B25J 15/08*    (2006.01)

(52) U.S. Cl.
CPC ......... *B25J 15/0213* (2013.01); *B25J 9/1065* (2013.01); *B25J 15/022* (2013.01); *B25J 15/026* (2013.01); *B25J 15/0266* (2013.01); *B25J 15/08* (2013.01); *B25J 17/02* (2013.01)

(58) Field of Classification Search
CPC ...... B25J 15/0213; B25J 15/06; B25J 15/022; B25J 15/026; B25J 15/0266
USPC .......................................... 294/106, 115, 116
See application file for complete search history.

(56) References Cited

U.S. PATENT DOCUMENTS

| | | | | |
|---|---|---|---|---|
| 5,108,140 A * | 4/1992 | Bartholet | ............. | B25J 15/0009 294/106 |
| 5,570,920 A * | 11/1996 | Crisman | ................... | B25J 9/104 294/111 |
| 8,720,964 B2 * | 5/2014 | Birglen | ................ | B25J 15/0009 294/106 |
| 8,973,958 B2 * | 3/2015 | Allen Demers | ..... | B25J 15/0009 294/106 |
| 10,265,862 B1 * | 4/2019 | Alqasemi | ............. | B25J 15/0038 |
| 2002/0060465 A1 * | 5/2002 | Laliberte | ............. | B25J 15/0009 294/106 |
| 2010/0181792 A1 * | 7/2010 | Birglen | ................ | B25J 15/0009 294/106 |
| 2011/0115244 A1 * | 5/2011 | Kamon | .................. | B25J 15/022 294/106 |
| 2011/0156416 A1 * | 6/2011 | Kawanami | ........... | B25J 15/0213 294/110.1 |
| 2014/0021731 A1 * | 1/2014 | Gao | ........................ | B25J 15/08 294/198 |

(Continued)

OTHER PUBLICATIONS

Sébastien Krut, "A Force-Isotropic Underactuated Finger", Proceedings of the 2005 IEEE, International Conference on Robotics and Automation, pp. 2325-2330, Barcelona, Spain, Apr. 2005.

*Primary Examiner* — Paul T Chin
(74) *Attorney, Agent, or Firm* — Guosheng Wang; United States Research and Patent Firm

(57) ABSTRACT

The proximal phalanx of an underactuated mechanical finger includes a cam fixed on a linkage. Upon actuation, the linkage rotates the cam, which then drives a cam follower, which then drives an extensible part in the distal phalanx to extend the length of the finger, and therefore compensate the finger's height loss that would otherwise occur in the absence of the extensible part.

15 Claims, 19 Drawing Sheets

(56) References Cited

U.S. PATENT DOCUMENTS

| | | | |
|---|---|---|---|
| 2014/0114439 A1* | 4/2014 | Iversen | A61F 2/586 |
| | | | 623/64 |
| 2014/0180477 A1* | 6/2014 | Chung | B25J 9/1612 |
| | | | 700/258 |
| 2017/0252930 A1* | 9/2017 | Birglen | B25J 15/0206 |
| 2018/0117773 A1* | 5/2018 | Odhner | B25J 15/0009 |

* cited by examiner

UNDERACTUATED MECHANICAL FINGER CAPABLE OF LINEAR MOTION WITH COMPENSATORY DISPLACEMENT, MECHANICAL GRIPPER AND ROBOT CONTAINING THE SAME

CROSS-REFERENCE TO RELATED APPLICATIONS

Not applicable.

STATEMENT REGARDING FEDERALLY SPONSORED RESEARCH OR DEVELOPMENT

Not applicable.

NAMES OF PARTIES TO A JOINT RESEARCH AGREEMENT

Not applicable.

REFERENCE TO AN APPENDIX SUBMITTED ON COMPACT DISC

Not applicable.

FIELD OF THE INVENTION

The present invention generally relates to an end effector, a gripper or a hand in robotics and other applications. Exemplary embodiments of the invention provide a multi-fingered underactuated gripper capable of performing parallel pinching and self-adaptive grasping. Robots that can utilize the present invention include a humanoid robot, an industrial robot, a manipulator, a mining robot, a service robot, a healthcare robot, a surgery robot, an educational robot, a research robot, a modular robot, a reconfigurable robot, a collaborative robot, a sex robot, a swarm robot, a military robot, a domestic robot, a mobile robot, a teleoperated robot or telerobot, and a space probe, among others.

BACKGROUND OF THE INVENTION

Robotic hands are popular end-effectors that have been developed with the aim of matching the human hands in terms of dexterity and adaptation capabilities. Robotic hands are often designed to equip either a dexterous manipulator for pick-and-place tasks or a human being as a prosthetic device. As robots move to new, highly unpredictable environments such as homes or outdoors, the demands placed on their grasping abilities become increasingly complex. Traditional robotic grippers have been split into two broad categories: simple industrial grippers and complex multifingered hands. The former category provides excellent grip strength and simplicity of design but does not allow for dexterous manipulation of grasped objects. The latter category provides agile grasping but suffers from complexity of mechanical design and control.

Traditional dexterous robotic hands, such as the Utah/MIT hand, the Stanford/JPL hand, and the DLR hand, have required large numbers of actuators, leading to elaborate control schemes involving multi-layer computer algorithms and software synergies. In many applications such as prosthetics, such control schemes are impractical or inefficient due to the intensive hardware and software requirements. For instance, weight restrictions for usability of prosthetic hands make fully actuated standalone prosthetic hands very difficult to make with current technology. The need to carry out a wide variety of complicated grasps while maintaining a relatively simple control scheme and low weight has led to the recent development of underactuated fingers that are mechanically intelligent.

Significant efforts have been made to find designs simple enough to be easily built and controlled, and special emphasis has been placed on achieving the required degrees of freedom (DOF) while decreasing the number of required actuators. Some prototypes may be driven by tendons or linkages, which lead to the automatic and mechanical adaptation of the robotic finger to the shape of the object seized. Prominent examples of mechanically underactuated fingers include the SDM hand and the SARAH hand. Such fingers require fewer actuators than the number of degrees of freedom that they possess, relying on mechanical designs incorporating passively compliant elements to allow the hand to respond to the environment and select the best grasp type to perform. More recently, some grippers have been created using the concept of mechanical underactuation to ensure both good versatility and simplicity. These underactuated hands possess many degrees of freedom, allowing for a versatile grasping scheme, but they depend on only a few actuators to realize grasps. Thus, these hands often make use of mechanically compliant elements, particularly springs and limits, to control the grasping process. They can be designed using a wide variety of mechanisms, including tendons, belt drives, and linkages.

For a conventional multi-fingered robotic hand, there are three primary modes of grasping: parallel, coupled, and self-adaptive. Modern hands focus on the combination of these types of grasps. For instance, several parallel and self-adaptive (PASA) grasping hands have already been created using a variety of mechanisms, including coupled and self-adaptive designs using tendons and linkages, and parallel and self-adaptive designs using belt drives. An important property of underactuated fingers is the ability to realize different types of grasps. In particular, a dexterous hand ought to be able to realize both pinch grasps and encompassing grasps. The parallel pinch/grasp is shown in panel (a) of FIG. 1, and the self-adaptive encompassing grasp is shown in panel (b) of FIG. 1. Combining these two grasp schemes leads to a PASA finger. Panels (a) and (b) of FIG. 2 schematically depict two designs of underactuated PASA finger using linkages in the prior art. FIG. 3 demonstrates how the parallel pinch is executed by a prior art linkage design in panel (a), and how the encompassing grasp is executed by a prior art linkage design in panel (b).

However, a problematic issue exists with the current PASA grasping scheme. When the fingers close circularly, they will create a height gap, as shown in FIG. 4. This gap makes it difficult to pick up small objects that rest against a surface using a parallel pinch, a task commonly encountered when picking up items from a table. If the finger starts from the upright position as shown in panel (a) of FIG. 4, it may miss the object entirely as shown in panel (b). If the finger starts beyond the upright position as shown in panel (c) in FIG. 4, it may experience interference with the surface, preventing it from closing as shown in panel (d). In known designs, such a grasp can only be realized if the wrist is moved along with the fingers. This would increase the control complexity, require a highly accurate visual sensor, and sacrifice the benefits of an underactuated finger. Ideally, the fingers can close linearly during the parallel pinch process while still be able to perform a self-adaptive encompassing grasp. In FIG. 5, the gap distance $\Delta s = L1 - L1 \cos \theta$, where L1 is the length of the proximal phalanx and $\theta$ is its angle deviated from the upright position/orientation/direction. The gap distance Δs also equals to the reduction of the vertical height of the finger. In FIG. 6, panel (a) shows the phalanx positioning during parallel mode, and panel (b) shows the self-adaptive mode. The proximal joint shaft angle θ1 is the angle of the proximal phalanx's orientation deviated from the upright position/orientation/direction (wherein θ1=0). The distal joint shaft angle θ2 is the angle of the distal phalanx's orientation deviated from the proximal phalanx's position/orientation/direction (wherein θ2=0 the distal phalanx and the proximal phalanx constitute a straight line).

People have attempted to design a mechanism that gives the correct compensatory displacement. The most obvious way to accomplish this is to simply translate the rotational motion of the distal joint shaft into a translational motion along the distal phalanx. However, most of simple mechanisms capable of performing such a transformation do so with constrains or less degree of freedom. For example, a change in the angle results in a fixed proportional change in the translational motion, as in a gear rack. While this design may provide a decent approximation of the true gap distance for small angles, the inherent constraints means that such mechanisms do not scale up well and are not suitable for environments where a high degree of precision is required. On the other hand, the desired mechanism should allow varying gap distance varies according to the cosine of the angle. In prior arts, Such a motion may be possible with a large, complicated mechanism or additional actuators however, it remains to be achieved to have a simpler mechanism while maintaining the degree of freedom and mathematical precision in the hand to ensure a robust and reliable motion—that is, truly adaptive grasping.

Advantageously, the present invention provides a novel underactuated finger that is capable of performing adaptive parallel grasping motions without the use of an additional actuator by offering desired compensatory displacement. The compensatory displacement is not fixed by proportional movement by truly adaptive with respect to any environment boundaries. For example, some embodiments of the invention may use an eccentric circular cam revolved about a point on its circumference, lifting a follower whose motion can be amplified to give the precise compensatory displacement needed to ensure a smooth grasping motion. Some embodiments of the present invention solve the problem in the prior art by causing the distal phalanx of the finger to extend and retract/shrink automatically with the motion of the proximal phalanx, and keeping the fingertip's motion linear. Although the embodiment depicted herein shows two phalanges, a person skilled in the art will realize that the same principle can be applied to fingers having any number of phalanges.

SUMMARY OF THE INVENTION

One aspect of the present invention provides a mechanical finger comprising (1) a base containing an actuator, (2) a distal phalanx including a main body and an extensible part coupled to the main body, (3) one or more middle phalanxes between the base and the distal phalanx. A cam phalanx is defined as a phalanx selected from said one or more middle phalanxes, and the cam phalanx includes a linkage, onto which a cam is mounted and fixed. The cam is engaged with a cam follower, which is engaged with the extensible part. Under an actuation of the actuator, the linkage can rotate the cam, which then drives the cam follower, which then drives the extensible part to vary a spatial relationship between the extensible part and the main body.

Another aspect of the invention provides a mechanical gripper comprising one or more aforementioned mechanical fingers.

Still another aspect of the invention provides a robot comprising one or more aforementioned mechanical grippers.

The above features and advantages and other features and advantages of the present invention are readily apparent from the following detailed description of the best modes for carrying out the invention when considered along with the accompanying drawings.

BRIEF DESCRIPTION OF THE SEVERAL VIEWS OF THE DRAWINGS

The present invention is illustrated by way of example, and not by way of limitation, in the figures of the accompanying drawings and in which like reference numerals refer to similar elements. All the figures are schematic and generally only show parts which are necessary in order to elucidate the invention. For simplicity and clarity of illustration, elements shown in the figures and discussed below have not necessarily been drawn to scale. Well-known structures and devices are shown in simplified form, omitted, or merely suggested, in order to avoid unnecessarily obscuring the present invention.

DETAILED DESCRIPTION OF THE PREFERRED EMBODIMENT

In the following description, for the purposes of explanation, numerous specific details are set forth in order to provide a thorough understanding of the present invention. It is apparent, however, to one skilled in the art that the present invention may be practiced without these specific details or with an equivalent arrangement.

Where a numerical range is disclosed herein, unless otherwise specified, such range is continuous, inclusive of both the minimum and maximum values of the range as well as every value between such minimum and maximum values. Still further, where a range refers to integers, only the integers from the minimum value to and including the maximum value of such range are included. In addition, where multiple ranges are provided to describe a feature or characteristic, such ranges can be combined.

It is also to be understood that the terminology used herein is for the purpose of describing particular embodiments only, and is not intended to limit the scope of the invention. For example, when an element is referred to as being "on", "connected to", or "coupled to" another element, it can be directly on, connected or coupled to the other element or intervening elements may be present. In contrast, when an element is referred to as being "directly on", "directly connected to", or "directly coupled to" another element, there are no intervening elements present.

Figure 7:
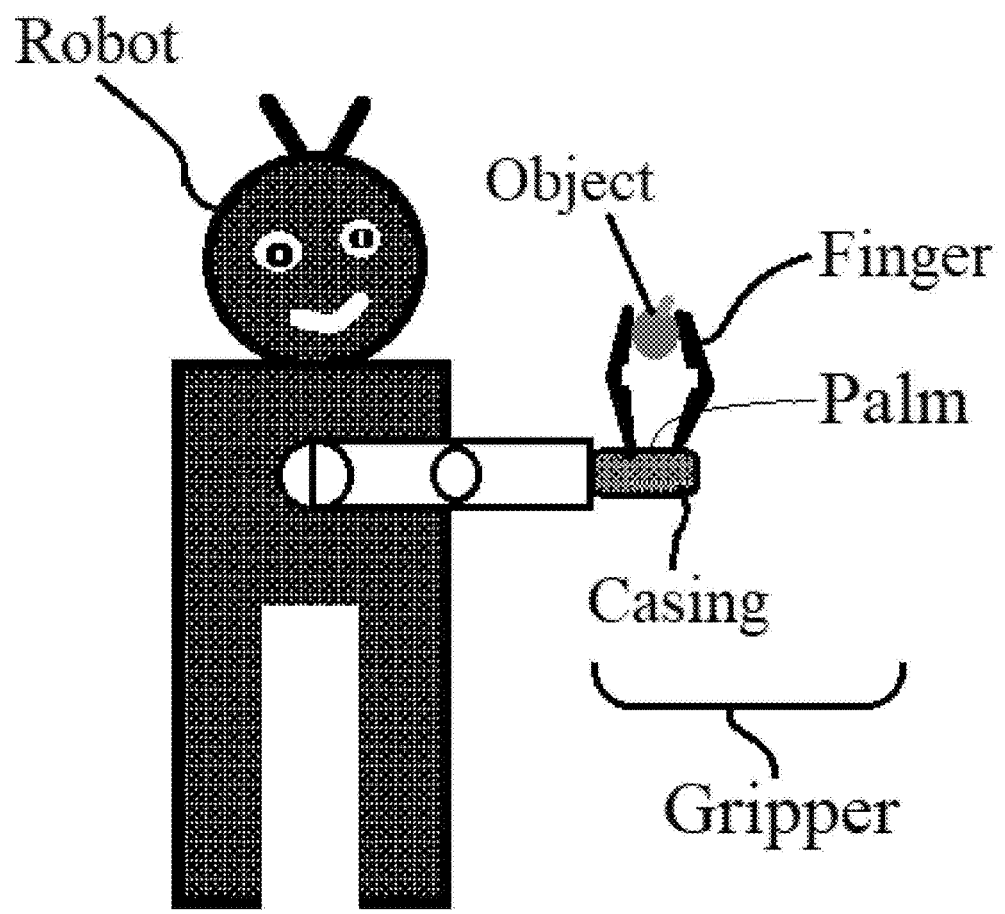
FIG. 7 depicts a humanoid robot in accordance with an exemplary embodiment of the present invention.

An exemplary robot of the invention is shown in FIG. 7. Although the robot is illustrated as a humanoid robot, it is contemplated that the robot of the present invention may include, for example, an industrial robot, a manipulator, a mining robot, a service robot, a healthcare robot, a surgery robot, an educational robot, a research robot, a modular robot, a reconfigurable robot, a collaborative robot, a sex robot, a swarm robot, a military robot, a domestic robot, a mobile robot, a teleoperated robot or telerobot, and a space probe, among others. The robot includes at least one mechanical gripper, and the gripper includes at least one mechanical finger. More particularly, the gripper is an under-actuated gripper that has fewer actuator(s) than degrees of freedom (DOF). For example, the gripper may include a pair of the fingers used in combination to define a set of pliers. A skilled person will understand that various embodiments of the gripper could have additional fingers without departing from the scope of the claimed invention.

Actuators that can be employed in the present invention include, but are not limited to, an electric actuator, a hydraulic actuator, a pneumatic actuator, thermal or magnetic actuator, an actuator based on shape memory alloys, mechanical actuator, a soft actuator enabling the robot to handle fragile objects, and any other suitable transducers.

Embodiments of the invention are related to a method of synthesizing mechanical architectures of self-adaptive robotic fingers driven by linkages. Self-adaptive mechanisms are used in robotic fingers to provide the latter with the ability to adjust the fingers to the shape of the object seized without any dedicated electronics, sensor or control. Object is also known as a load applied to the finger. In preferred embodiments, the mechanical finger of the invention does not include any dedicated electronics, control, or sensor such as a computer vision system, light beam interrupt detection system, contact switch, magnetic or capacitive sensor or the like. However, the mechanical finger in other embodiments of the invention may include dedicated electronics, control, or sensor such as a computer vision system, light beam interrupt detection system, contact switch, magnetic or capacitive sensor or the like.

The gripper as shown in FIG. 7 has two under-actuated fingers that are facing each other, and are connected to a single mechanical casing. The mechanical casing has a palm that lies between the fingers. The palm surface may be adapted to stabilize a load when performing an encompassing grasp. The palm defines a contacting surface, while each phalanx in the figures may have a contacting surface. The gripper can apply a force against an object through these contacting surfaces. The casing may be a cover for covering either one or all of a transmission mechanism, a motorization unit and a control unit. The transmission mechanism may be a single actuator that is adapted to drive the two fingers. According to another embodiment, the fingers are each independently driven by a corresponding transmission mechanism. Additional flexibility may be provided by the gripper as it is able to independently control each finger.

In various exemplary embodiments, the transmission mechanism (not shown) may be a self-locking transmission mechanism. The gripper having such a transmission mechanism is non-back-drivable. When no power is applied to the actuator, the gripper is prevented from opening even when an object is grasped. This feature adds safety to the gripper since it will not lose grip of a load or object even if power is lost. Moreover, the energy required to operate the gripper is reduced with the use of such a self-locking transmission mechanism.

Figure 8:
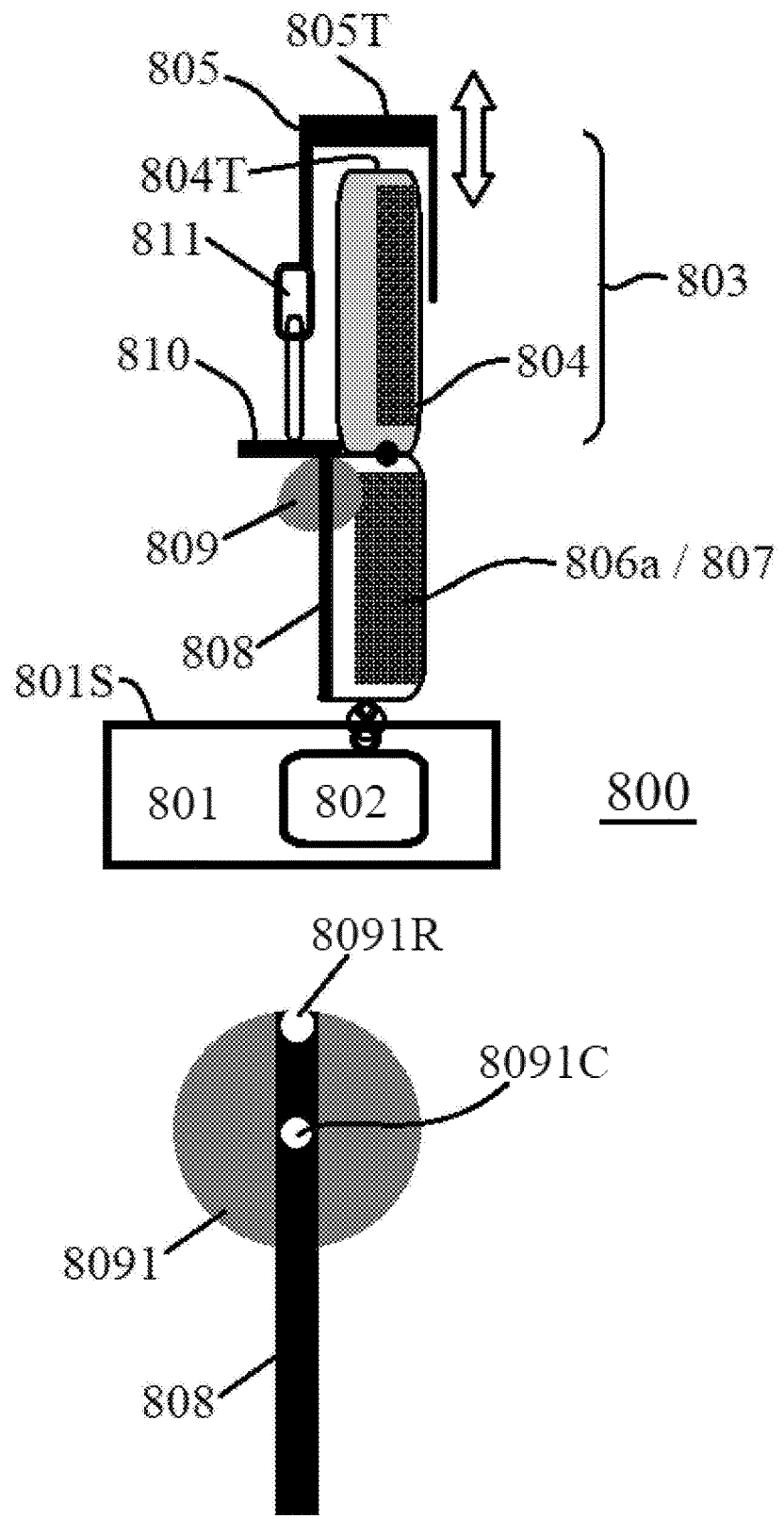
FIG. 8 schematically shows a mechanical finger with a cam phalanx in accordance with an exemplary embodiment of the present invention.

In some embodiments of the invention as shown in FIG. 8, the mechanical finger 800 may comprise (i) a base or a mechanical casing 801 that contains an actuator 802 such as a motor and a drive mechanism, (ii) a distal phalanx 803 including a main body 804 and an extensible part 805 coupled to the main body 804, (iii) one or more middle phalanxes 806a, 806b (not shown), and 806c (not shown) etc between the base 801 and the distal phalanx 803.

A cam phalanx 807 is defined as a phalanx selected from said one or more middle phalanxes (in this example 806a). The cam phalanx 807 includes a linkage 808, onto which a cam 809 is mounted and fixed, i.e. the spatial relationship between linkage 808 and cam 809 remain unchanged. In other words, linkage 808 and cam 809 may be viewed as an integrated single piece in the architecture of the finger. The cam 809 is engaged with a cam follower 810, which is engaged with the extensible part 805. Cam follower 810 may be directly connected to, or engaged to, the extensible part 805. Alternatively, cam follower 810 may be indirectly connected to, or engaged to, the extensible part 805, i.e. via an intermediate transmission system 811 to transfer or translate the movement of cam follower 810 to extensible part 805. Upon an actuation of the actuator 802, the linkage 808 can rotate the cam 809, which then drives the cam follower 810, which then drives the extensible part 805 to vary a spatial relationship between the extensible part 805 and the main body 804. For example, the intermediate transmission system 811 may be a gear system (e.g. concentric gears), a belt system, tendons, bars, or any combination thereof.

To achieve self-adaptive finger movements, a number of actuators 802 less than the number of DOF of the mechanism should be placed in coordination with passive elements. Proper selection and location of both actuation and passive elements are needed. A designer cannot arbitrarily select a joint in the finger to be actuated. A preferred design should be made in order for the actuation torque to be distributed to all the joints. The actuation torque (or force in the case of a prismatic joint) distribution is a fundamental characteristic of self-adaptive fingers. For each joint, there exists at least one configuration where the actuation torque is distributed to this joint. In other words, the joint torques should not be independent of the actuation torque.

In an embodiment, the base 801 may have a base plane 801S (actual or conceptual), which may be, for example, the palm of a robot hand. When distal phalanx 803 and one or more middle phalanxes 806 such as 806a, 806b, 806c etc are in the most extended configuration (commonly known as "the most upright orientation" relative to the base plane 801S), each of the phalanxes is perpendicular to base plane 801S.

The height of distal phalanx 803 and the height of extensible part 805 are both defined as the distance from a given point (e.g. distal tip 805T) of extensible part 805 to base plane 801S. The height of main body 804 is defined as the distance from a given point (e.g. distal tip 804T) of main body 804 to base plane 801S. The spatial relationship between the extensible part 805 and the main body 804 is variable. For example, during a finger operation such as pinching and/or encompassing, the variation V1 of the extensible part's height is not necessarily the same as the variation V2 of the main body's height. The mathematical relationship between. V1 and V2 may be V1=V2, V1>V2 or V1<V2. In other words, varying the "spatial relationship between the extensible part 805 and the main body 804" may include increasing or decreasing, the distance between distal tip 804T and distal tip 805T. Both extensible part 805 and main body 804 are mechanically rigid objects in this example.

There is no specific limitation to cam 809's profile, and the relationship between the cam 809 and linkage 808. In a preferred embodiment, the cam 809 is an eccentric cam that revolves about a point near or on its circumference. For example, cam 809 may be a circularly-shaped cam 8091, which revolves about a cam point 8091R that is near or on the cam's circumference. Linkage 808 may be configured to pass both point 8091R and the center of circular cam 8091, i.e. point 8091C. By "near or on the cam's circumference", it is intended to mean that the distance from cam point 8091R to the center 8091C is in the range of 0.9-1.1 Rc, preferably 0.95-1.05 Rc, and more preferably 0.98-1.0 Rc, where Rc is the radius of circularly-shaped cam 8091.

In some embodiments, only one middle phalanx 806a is present between the base 801 and the distal phalanx 803. In this configuration, middle phalanx 806a is, as a matter of course, named as proximal phalanx 806a or cam phalanx 807.

In an exemplary embodiment, proximal phalanx 806a comprises a closed loop linkage assembly. For example, the closed loop linkage assembly may include only binary and/or quaternary linkages, with no ternary linkage. The term "linkage XY" in the present invention is defined as a linkage with two revolute joints X and Y on its two opposite ends. The length of the linkage XY may be longer than, or substantially the same as, the distance between points X and Y. It is contemplated that revolute joints X and Y can also be any connection joints or connector that allows a pivotal movement in each connection of the linkage.

Figure 9A:
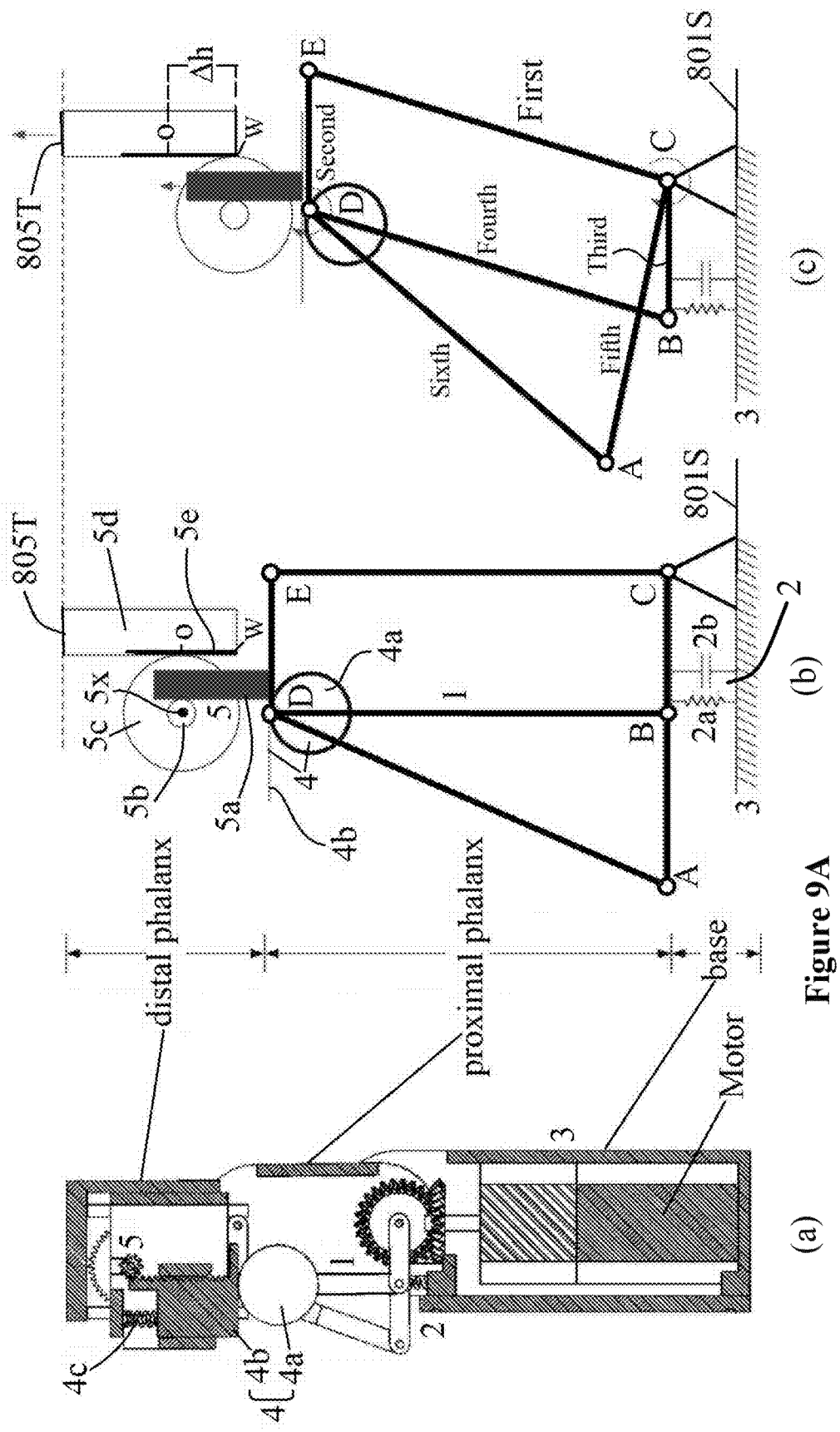
FIG. 9A schematically shows a mechanical finger with a modified four-bar parallelogram in accordance with an exemplary embodiment of the present invention.

As shown in FIG. 9A, the proximal phalanx may include a first linkage CE having a proximal end near C and a distal end near E relative to the base 3. The first linkage CE is pivotally connected at its proximal end to the base 3 using a revolute joint C A second linkage DE is pivotally connected at a first end to the distal end of the first linkage CE using a revolute joint E. A third linkage BC is pivotally connected at a first end to the proximal end of the first linkage CE using the revolute joint. C. A fourth linkage BD is pivotally connected at a first end to a second end of the second linkage DE using a revolute joint D, and is pivotally connected at a second end to a second end of the third linkage BC using a revolute joint B.

An assembly 2 including a spring 2a and a mechanical limit 2b may be placed between the third linkage BC and the base 3, maintaining the mechanical finger in an extended position. It is contemplated that assembly 2 can take any other suitable forms. A skilled person will understand that the spring 2a could be replaced by any other type of biasing means. The biasing means could be located on any one of the connection joints without departing from the scope of the claimed invention. For example, the spring 2a can be any other suitable resilient element such as a torsion spring. Within its limit, the spring 2a can maintain the mechanical finger in an extended position. In the extended position, the finger is properly oriented to do a pinch grasp. The spring keeps the mechanical limit (e.g. a mechanical stopper) engaged as long as a load isn't applied on one of the phalanxes.

A skilled person will also understand that the mechanical limit 2b could be of any other type of stopping mechanism to allow the third linkage BC to remain oriented in substantially parallel with base plane 801S. Alternatively, the mechanical stopper may be a blocking member of any suitable shape or form such as a protruding blocking member. A flexion stopper may also be employed to prevent flexion of the joint beyond a predetermined angle. The flexion stopper determines a maximum rotation of the linkage.

A fifth linkage AC has a proximal end near C and a distal end near A relative to the base 3. The fifth linkage AC is pivotally connected at its proximal end to the base 3 using the revolute joint C. A sixth linkage AD is pivotally connected at a first end to the fifth linkage AC using a revolute joint A, and is pivotally connected at a second end to both second linkage DE and fourth linkage BD using the revolute joint D. Fifth linkage AC and sixth linkage AD are preferably configured so as not to constrain the degrees of freedom (DOF) of the mechanical finger.

In preferred embodiments, the first, second, third and fourth linkages are configured as a four-bar parallelogram. In such a configuration, the distance between revolute joint D and revolute joint E equals to the distance between revolute joint B and revolute joint C. The distance between revolute joint. D and revolute joint B equals to the distance between revolute joint E and revolute joint C. Pivot axes of said revolute joints A, B, C, D and E are preferably parallel to each other.

Figure 9B:
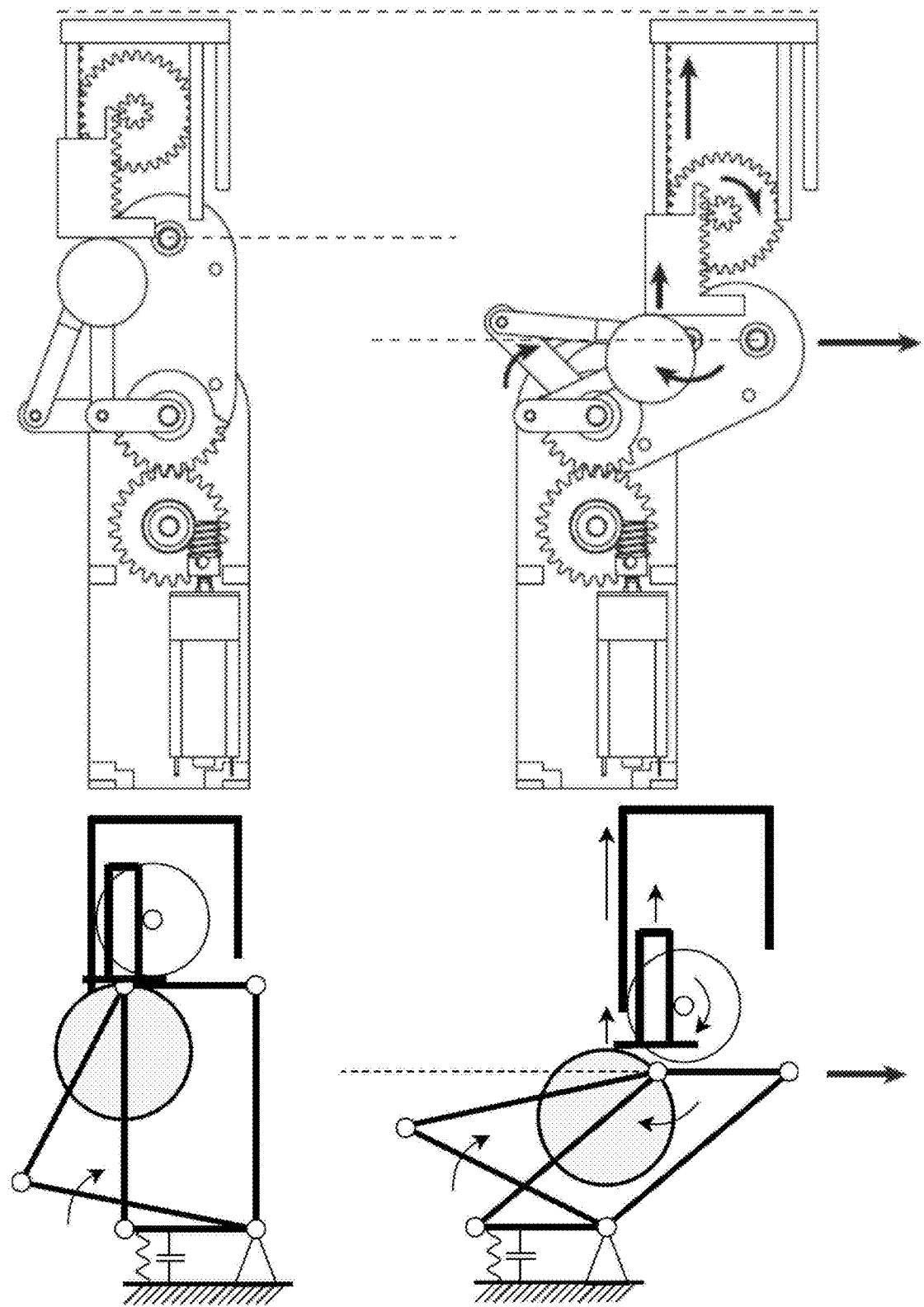
FIG. 9B illustrates the movements of various parts of the mechanical finger as shown in FIG. 9A in accordance with an exemplary embodiment of the present invention, FIG. 10 schematically depicts the forces (represented as arrows) acting on the figure structure of FIGS. 9A and 9B during parallel mode and self-adaptive mode in accordance with an exemplary embodiment of the present invention.

FIG. 9B illustrates the movements of various parts of the mechanical finger as shown in FIG. 9A. Referring to FIG. 9B in light of FIG. 9A, the actuator may actuate (e.g. only actuates) the fifth linkage AC to revolve/pivot about revolute joint C. In other words, revolute joint C is an active joint for the fifth linkage AC, and motion of the finger is initiated by an activated rotation of revolute joint. C. The cam 4a is fixed onto the first end of fourth linkage BD, and revolves/pivots about revolute joint D. The cam follower 4b may be driven by the cam 4a to a first direction (e.g. "upward"), and driven by cam follower's own gravity, a resilient member e.g. a spring, or any combination thereof to a second direction (e.g. "downward") that is different from (e.g. opposite to) the first direction. In an embodiment, the cam 4a drives the cam follower 4b, which then drives slider 5d (as an example of extensible part 805) using a first gear rack 5a, and a small gear 5b and a larger gear 5c. Gears 5b and 5c are concentric gears that are fixed on a same shaft 5x.

In a specific embodiment, the cam 4a has a radius r. When the cam spins angle θ, the cam follower 4b travels a distance r−r cos θ. The first gear rack 5a is attached to the cam follower 4b and used to rotate both the small gear 5b and the larger gear 5c about the same shaft 5x. Then the larger gear 5c moves a second gear rack 5e installed on slider 5d. For example, the point of second gear rack 5e where it is engaged with larger gear 5c may be shifted from point O to point W. The distance between point O and point W is a compensatory displacement Δh=pr−pr cos θ, where p is the ratio between the diameters of the larger gear 5c and smaller gears 5b. Value p may be set so that the compensatory displacement Δh is equal to, and therefore cancels off, a gap distance Δs of the main body of the distal phalanx during parallel pinching. By simple mathematic calculation, Δs is also the amount of height variation of the main body 804 of the distal phalanx 803 (or the height of cam phalanx 807) as measured from base plane 801S during parallel pinching. In this embodiment, eccentric cam 4a fixed to a modified four-bar linkage mechanism allows the finger to compensate for the typical gap distance (e.g. the gap Δs shown in FIG. 5, or height variation Δh of the main body 804) found during parallel pinching, improving the ability to grasp objects against surfaces and in tight spaces. As will be observed by a user, the distal phalanx can automatically extend or shrink/retract itself, and therefore increase/decrease the total length of the distal phalanx to compensate for this gap while moving in parallel pinching mode.

The geometry of the proximal phalanx is designed in such a way that the connection joints B, C, D and E form a parallelogram shape as presented in FIGS. 9A and 9B. This design allows the distal phalanx to remain perpendicular to base plane 801S for parallel pinching, at least during the initial stage.

Referring back to FIG. 9A for more details, panel (a) shows an exemplary finger design. Panel (b) shows a schematic diagram of the linkage mechanism. FIG. 9A shows five sub-systems 1-5: linkage mechanism 1, assembly 2 including spring 2a and mechanical limit 2b, base 3, cam 4a and follower 4b (collectively 4), and concentric gears and gear racks 5. Panel (c) shows the finger's configuration change during a parallel pinching. A reducer and transmission mechanism in the base is used to transmit the torque of the motor to link. AC, causing it to turn. Due to the spring 2a, link BC remains stationary at this time. This causes the entire finger to move forward (to the right) while the parallelogram geometry of the four-bar mechanism BCDE forces the distal phalanx, mounted on link DE, to stay parallel to its initial orientation ("upright"). Because the eccentric cam 4a is fixed to link BD, it rotates along with it. As the proximal phalanx rotates an angle θ, the cam 4a rotates an apparent angle θ with respect to link DE about point D as well.

Figure 1:
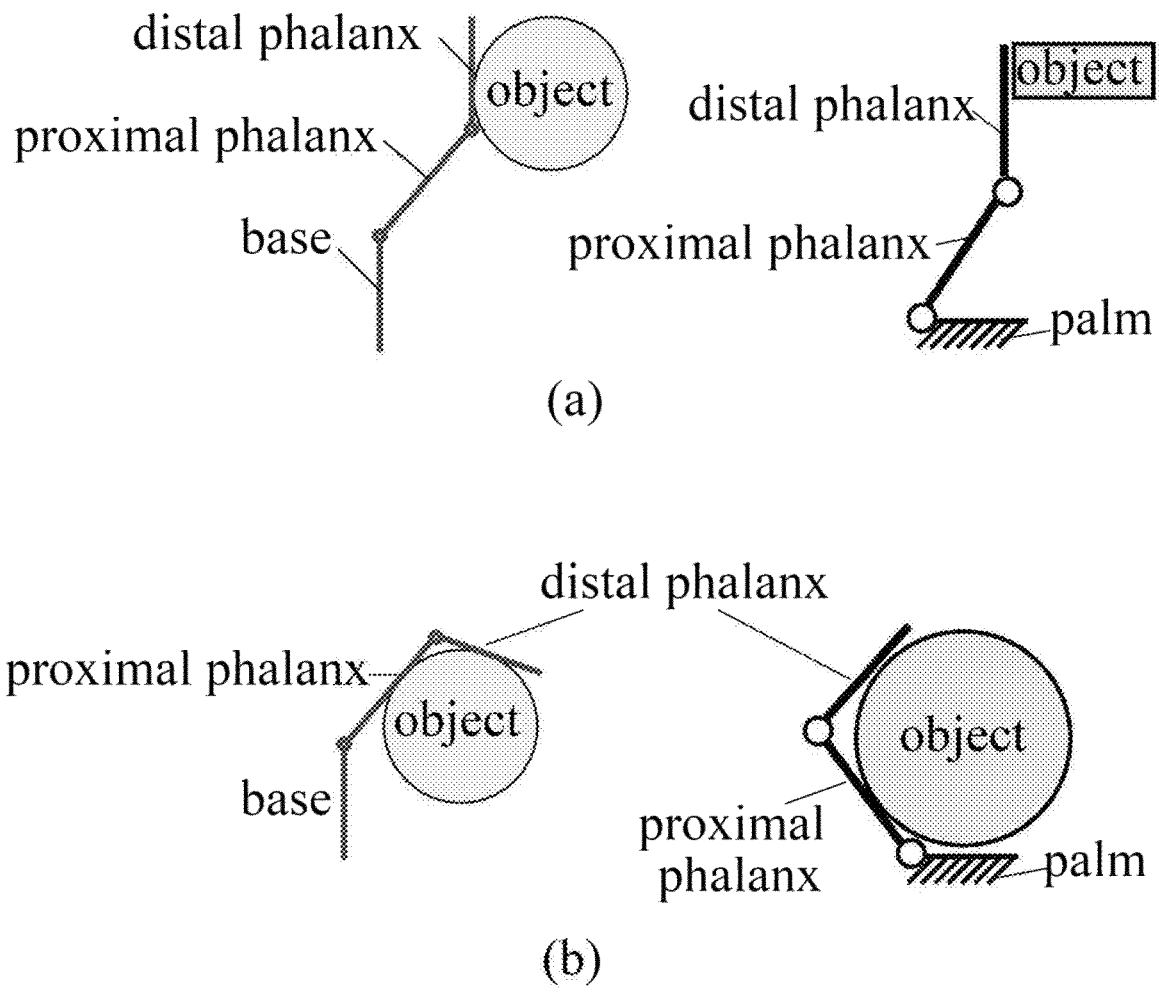
FIG. 1 schematically shows a parallel pinch/grasp and a self-adaptive encompassing grasp executed by a mechanical finger in the prior art.
Figure 2:
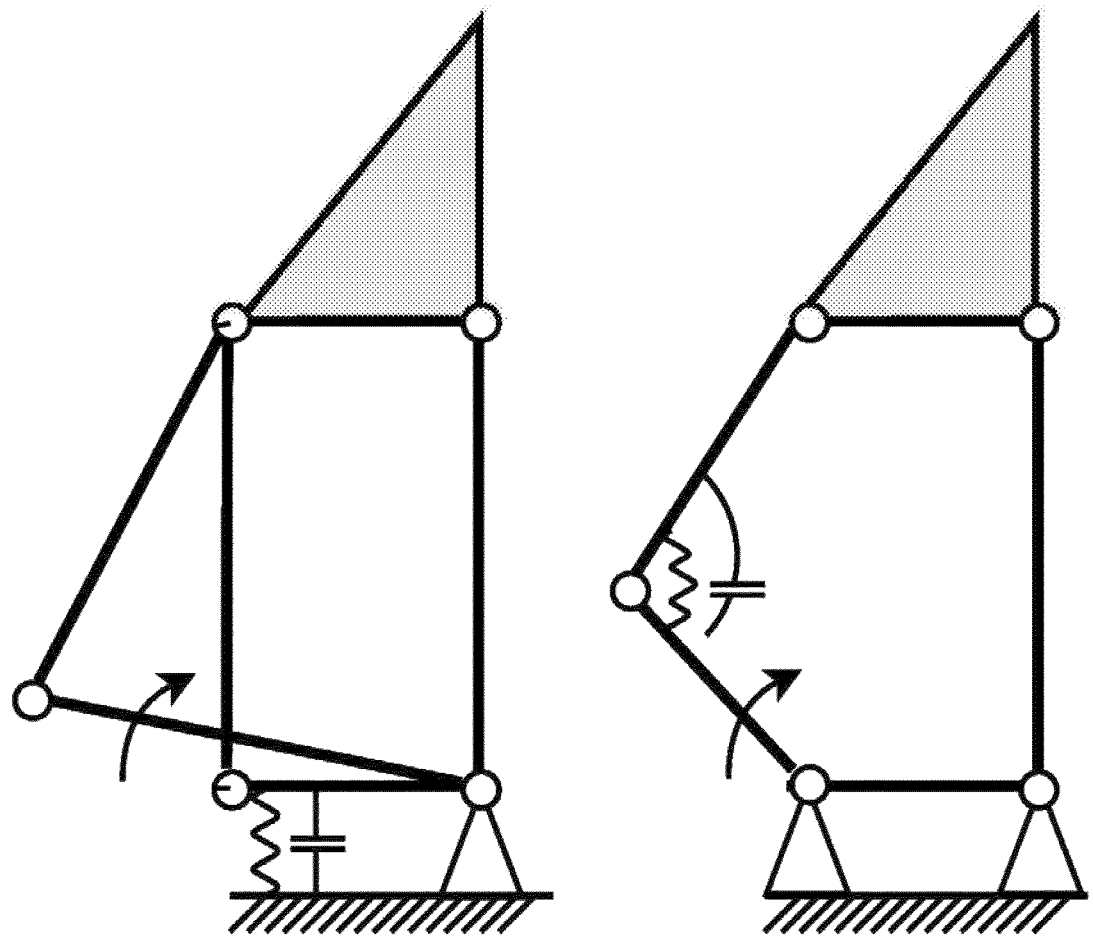
FIG. 2 schematically depict two designs of underactuated PASA finger using linkages in the prior art, FIG. 3 demonstrates how the parallel pinch and the encompassing grasp is executed by a prior art finger with linkage design.
Figure 3:
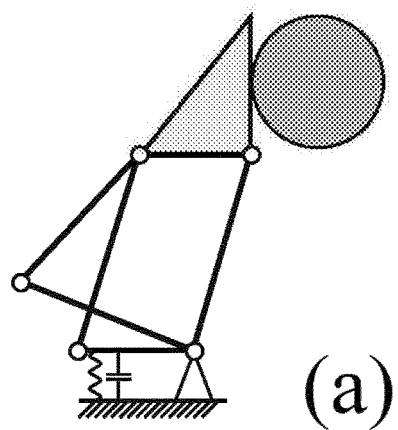
Figure 3:
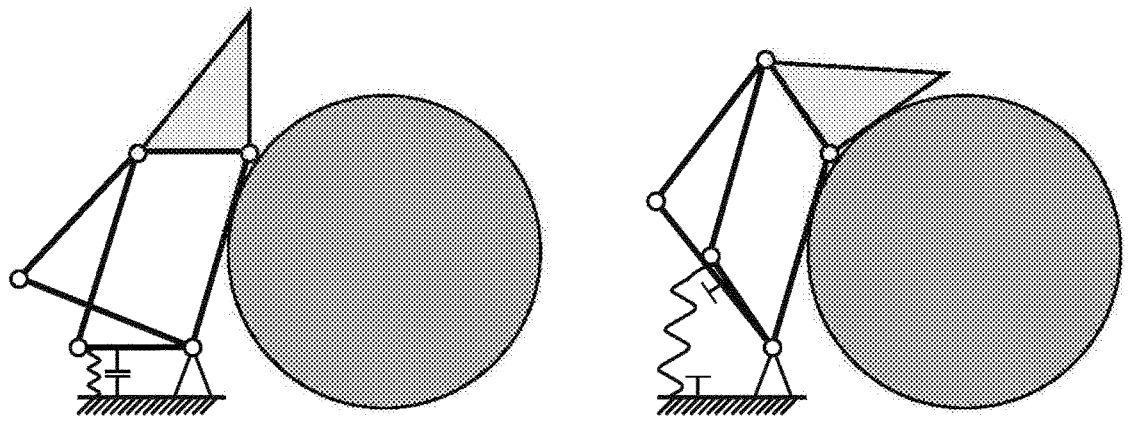
Figure 4:
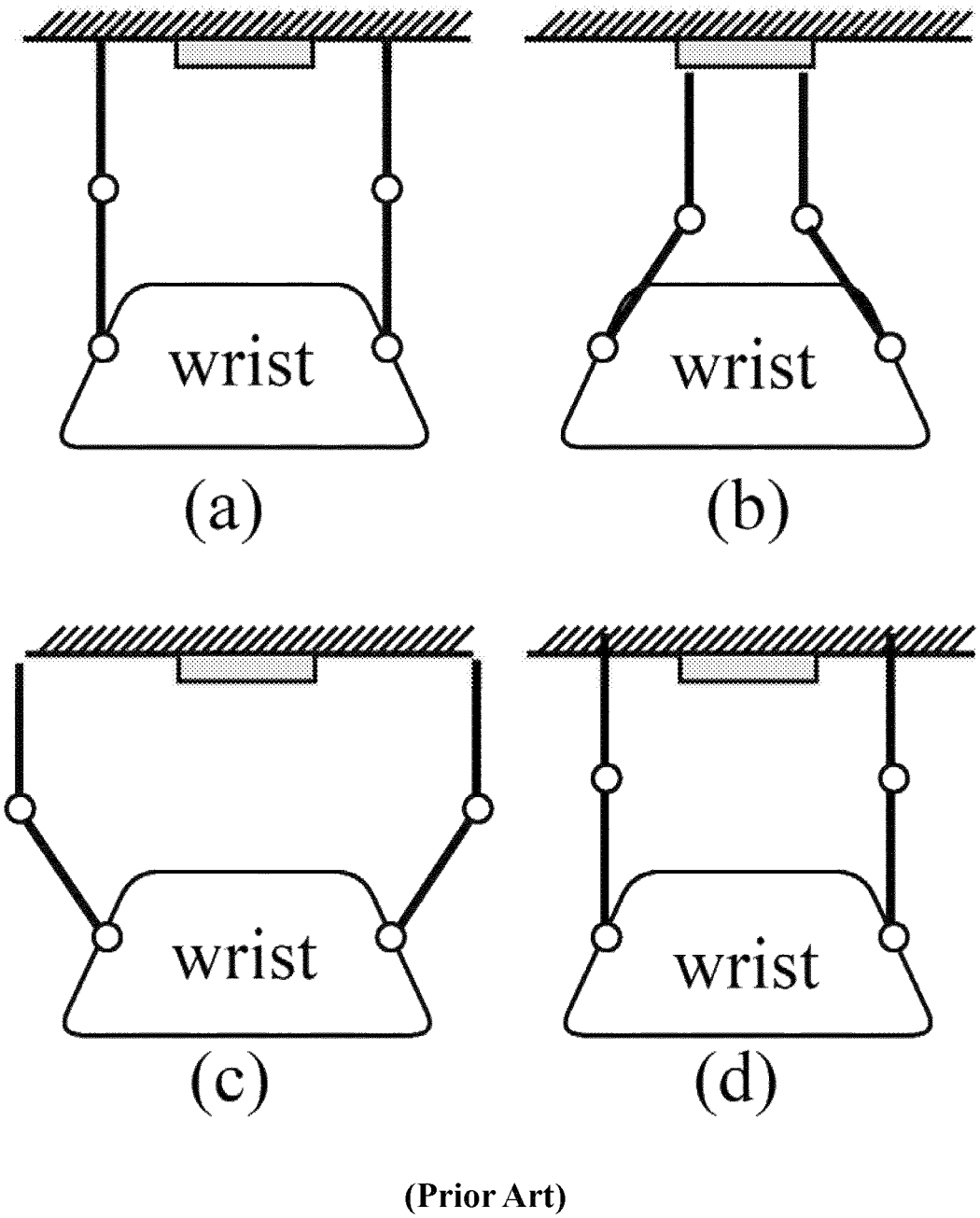
FIG. 4 illustrates that the prior art PASA grasping scheme has a problem of undesired fingertip movement—either a gap or over extension.
Figure 5:
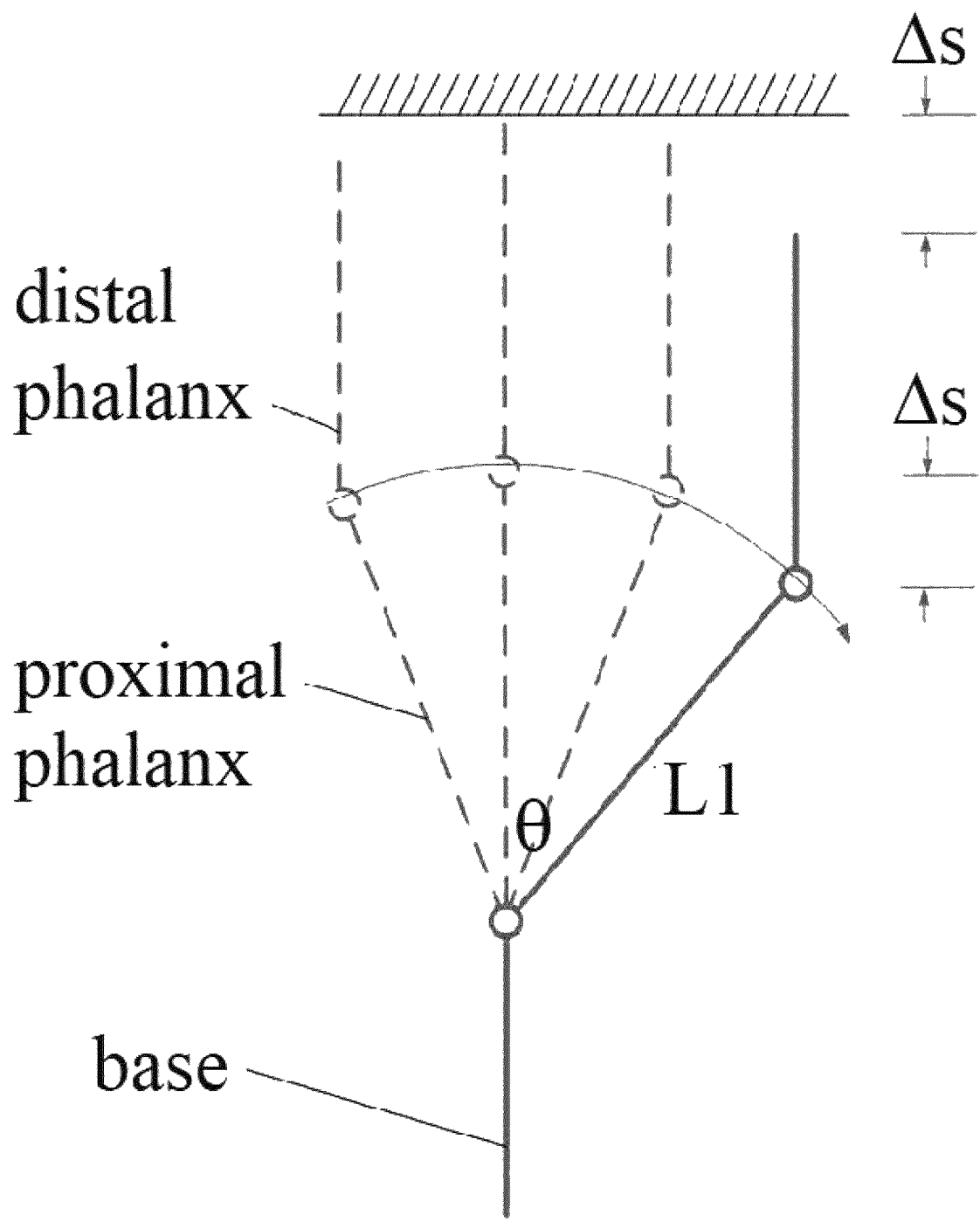
FIG. 5 illustrates the mathematical model of the finger height gap formation as shown in FIG. 4 for prior art PASA mechanism.
Figure 6:
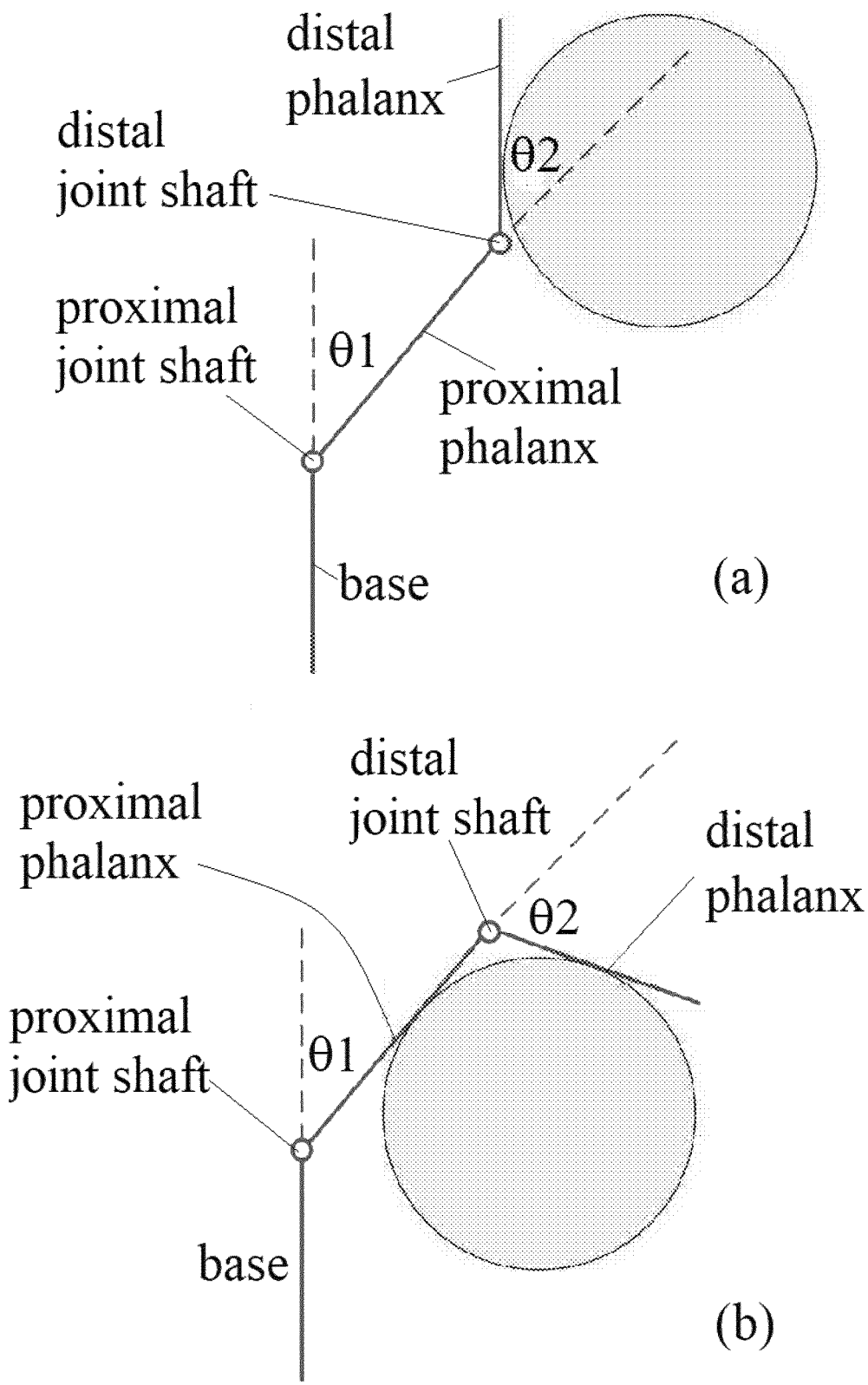
FIG. 6 shows the proximal joint shaft angle and the distal joint shaft angle during parallel mode and self-adaptive mode of a mechanical finger.

As the eccentric cam 4a revolves about a point (8091R) near or on its circumference, it lifts a flat-faced cam follower 4b. When the cam 4a with radius r has spun an angle θ corresponding to the proximal shaft angle, the follower 4b travel is given by the distance r−r cos θ. A gear rack 5a attached/engaged to the follower 4b then rotates a small gear 5b, which is fixed to a larger gear 5c on the same shaft 5x. This larger gear 5c then causes a slider 5d with a second gear rack 5e to move a compensatory displacement Δh=pr−pr cos θ, where p is the ratio between the diameters of the larger and smaller gears (5b, 5c). If value p is set correctly, this will cause the compensatory displacement Δh to equal the gap distance Δs as shown in FIG. 5.

In order for the cam follower 4b to keep with the motion of the cam 4a, it preferably remains in contact with the cam 4a profile at all times. In some finger designs, such contact may be maintained by gravity alone. In other finger designs, however, such contact may not be maintained by gravity alone, since the follower 4b may be small and lightweight and may be positioned beneath the cam 4a in certain hand positions. Instead, a spring 4c with a very low spring constant is used to press the follower 4b against the cam 4a. This spring 4c is preferably placed near the center of the follower 4b so that it does not produce a moment that might jam the follower 4b in its guides.

Figure 10:
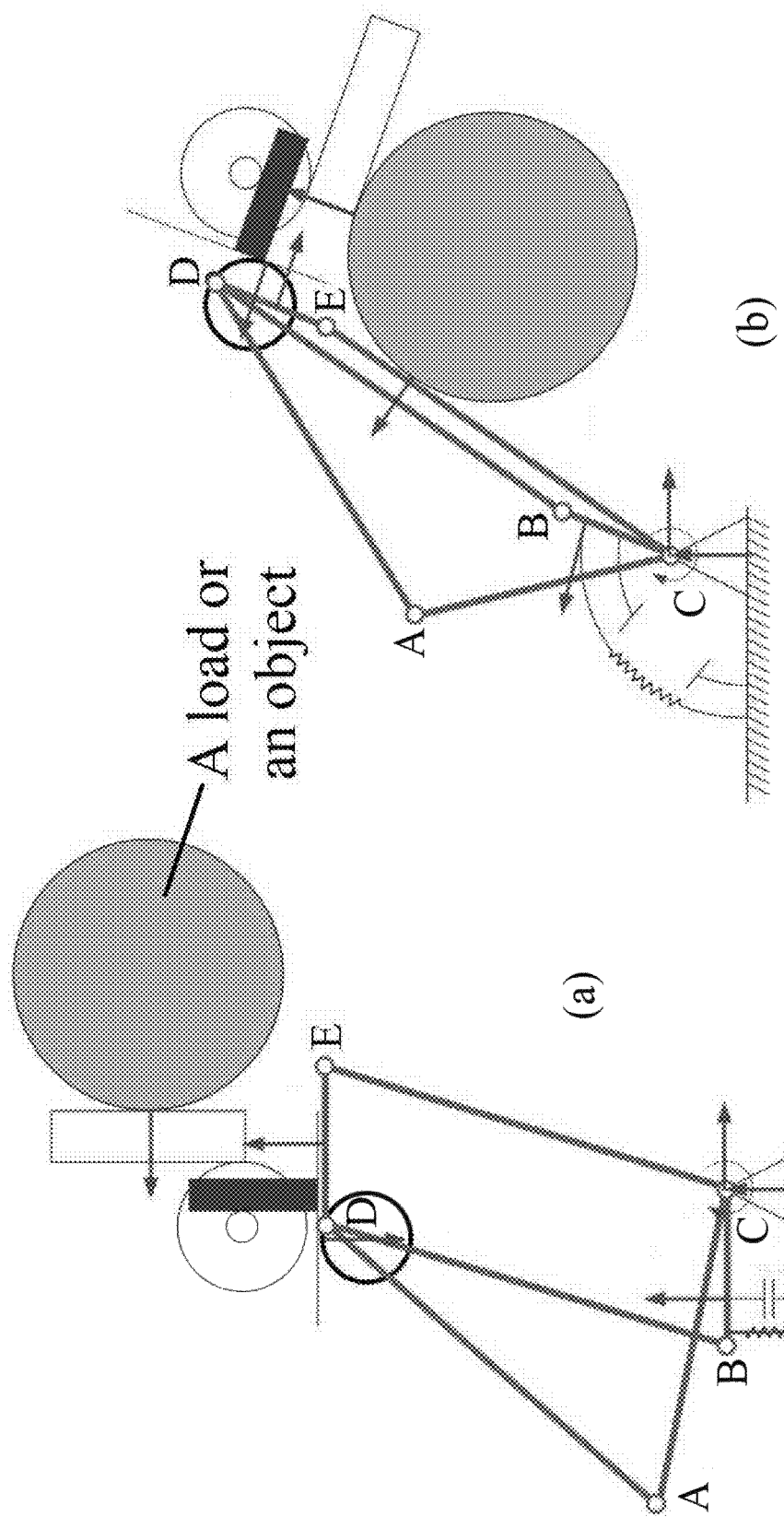

FIG. 10 schematically depicts the forces (represented as arrows) acting on the figure structure of FIGS. 9A and 9B during parallel mode in panel (a) and during self-adaptive mode in panel (b). The finger self-adaptive finger is driven by linkages and travels from a fully open position in panel (a) to a fully closed position in panel (b) in its closing sequence. The finger is actuated through the proximal phalanx, and a spring with a mechanical limit assembly 2 is used to maintain the finger fully extended. The closing sequence occurs with a continuous motion of the actuator such as a motor. Finally, both phalanges are in contact with the object and the finger has completed the shape adaptation. The actuator force is distributed, between the two phalanges in contact with the object.

When a load/object is applied on the distal phalanx, the actuation mechanism is adapted to allow the distal phalanx to translate and allow it to maintain a constant "upright" orientation in order to automatically perform a pinch grasp (i.e. parallel pinching). When a load is applied on the proximal phalanx or below a balanced point (e.g. the center) of the distal phalanx, the actuation mechanism is adapted to allow the distal phalanx to pivot and automatically perform an encompassing grasp.

Referring back to FIGS. 9A, 9B and 10 for more details, in order for the cam 4a to successfully lift the follower 4b, two conditions are preferably met: the pressure angle is sufficiently small, and the overturning moment due to the force between the cam 4a and the follower 4b does not produce a force large enough to jam the follower 4b. Due to the use of a flat-faced follower, the pressure angle is always zero and is therefore not an issue. Because the cam 4a is eccentric (i.e. the cam is offset from the follower travel), the precise overturning moment varies with the angle θ. It is preferred to keep the cam mechanism as small as possible in order to minimize the jamming effect of this moment. The embodiment overcomes this difficulty by keeping the cam 4a small and amplifying the follower 4b's travel using a set of concentric gears (5b, 5c).

If the finger encounters an object at the proximal phalanx during the parallel pinching motion, it will automatically switch to self-adaptive mode. The motor still rotates link AC, but because link CE is now completely immobilized by the object, link BC is forced to move/rotate against the spring 2a This allows the distal phalanx, which is fixed to link DE, to rotate ("downwardly") toward the object until it ultimately comes into contact with the object. During this motion, the angle between links BD and DE changes/decreases again, causing the cam 4a to rotate with respect to the distal phalanx. This has the effect of first decreasing and then increasing the length of the distal phalanx as it moves toward the object; however, in self-adaptive mode, this change in length has no effect on the finger's grasping ability.

In a variety of embodiments of the invention, ran object is picked up using only the distal phalanxes of at least two fingers. For instance, a small object lying on a desk where the pinch grasp is the only suitable way of taking it. To accomplish this pinch grasp, the distal phalanxes should maintain a parallel orientation with respect to each other as they travel toward each other for grasping the object in a pinching manner, just as with industrial parallel jaw grippers. This type of grasping is very important in the industry, since it ensures a better precision on the positioning of the object than with the encompassing grasp. For carrying out the pinch grasp, the distal phalanxes in FIGS. 9 and 10 stay parallel to each other automatically and without the use of an actuator.

Figure 11:
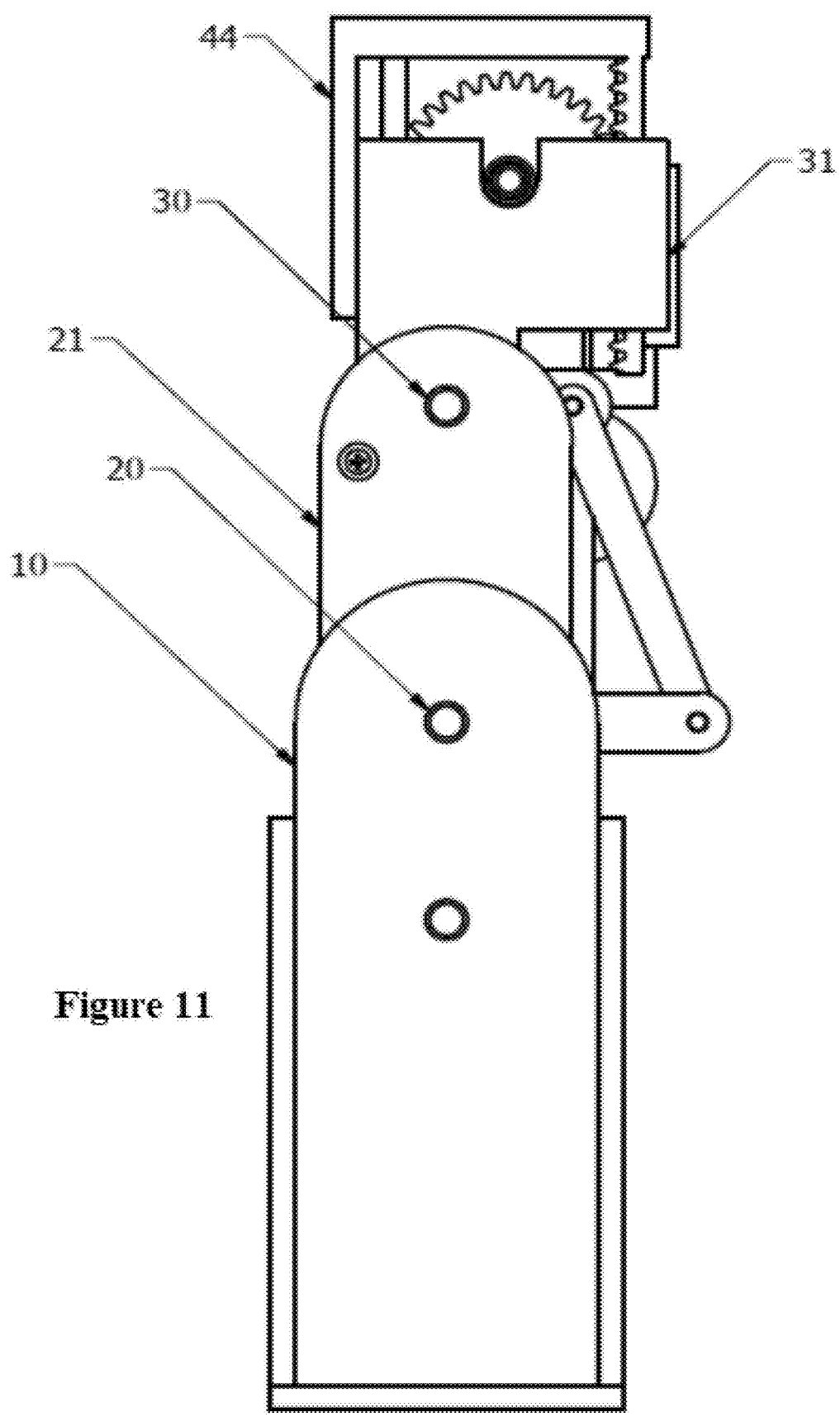
FIG. 11 shows the specific design of a mechanical finger in accordance with an exemplary embodiment of the present invention.
Figure 12:
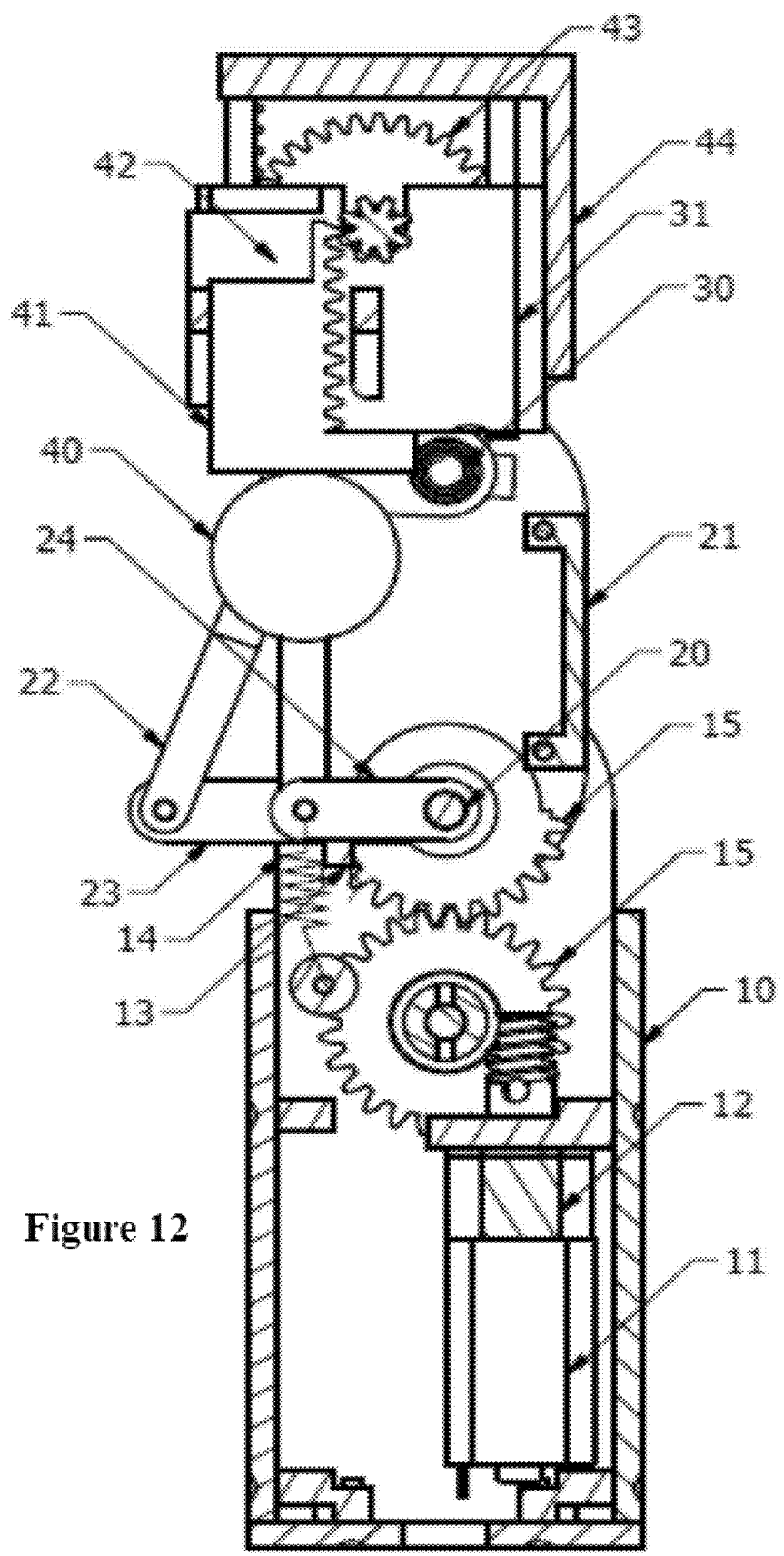
FIG. 12 is a sectional view of the mechanical finger of FIG. 11 in accordance with an exemplary embodiment of the present invention.

FIG. 11 and FIG. 12 show a specific design of the mechanical finger according to the invention. The finger structure is, in general, comprised of a base 10 housing an actuator 11, a reducer 12, and a transmission mechanism 15. Above base 10, proximal phalanx 21 is pivotally mounted on the metacarpal joint 20. Above the proximal phalanx 21, distal phalanx 31 is pivotally mounted on the interphalangeal joint 30. The mechanical finger includes link-combined cam 40, cam follower 41, concentric gears 43, and slider 44.

In a grasping process executed by the finger, motor 11 actuates link 23 and link 22 through reducer 12 and transmission mechanism 15. Since link 24 is effectively grounded by spring 14 and limit 13 at this time, the clockwise movement of link 23 causes the entire proximal phalanx 21 to rotate clockwise as well. However, the parallelogram geometry, formed by the link-combined cam 40 or cam-affixed link 40, link 24, proximal phalanx 21 and distal phalanx 31, forces the distal phalanx 31 to remain parallel to its initial orientation. This results in the parallel pinching motion. During this motion, as the proximal phalanx 21 rotates an angle θ, the entire finger lowers in height by L(1−cos θ), where L is the length of the proximal phalanx between joints 20 and 30. However, since the cam and link are fixed together 40, the cam also rotates an apparent angle θ with respect to the distal phalanx 31. This causes the cam 40 to lift the cam follower 41 by a distance of r(1−cos θ), where r is the radius of the cam 40. The cam follower 41 then engages concentric compound gear 43 with a pinion and rack mechanism 42, causing the gear to rotate likewise. This ultimately lifts the slider 44, extending the finger. In order to ensure that the extension of the finger is the correct compensatory displacement required to maintain linearly parallel pinching, the ratio between the two gears comprising 43 must be equal to the ratio of the diameter of cam and the length of the link to which it is affixed in part 40.

If the finger encounters an object at the proximal phalanx during the parallel pinch, the proximal phalanx 21 will become grounded by the object. If the motor continues to actuate link 23 clockwise, link 24 will be forced to move against spring 14, deforming the parallelogram. This will cause the finger to adapt to the shape of the object, wrapping the phalanges 21 and 31 around the object and realizing an encompassing grasp.

Figure 13:
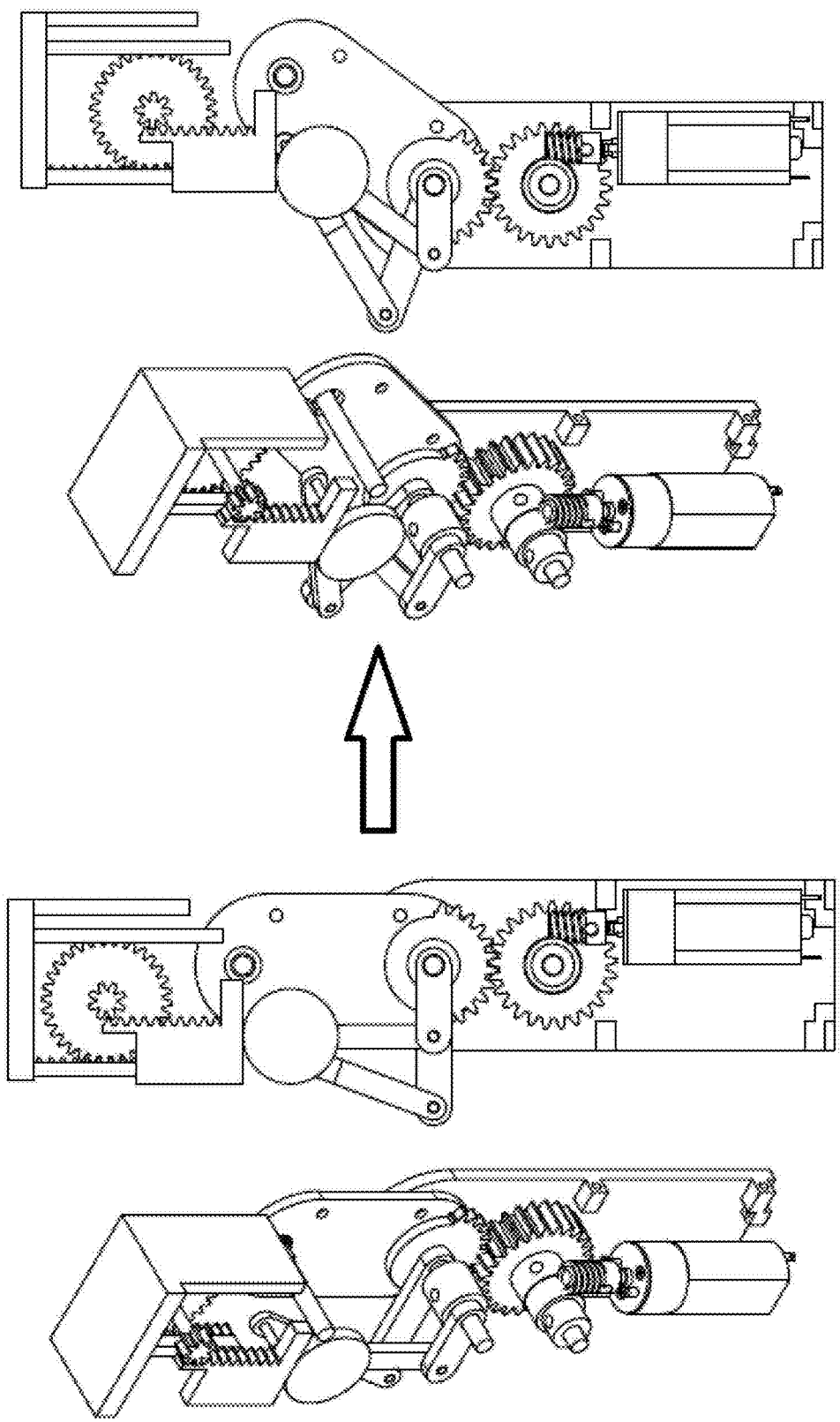
FIG. 13 schematically illustrates the internal movement of the mechanical finger of FIG. 11 during a parallel pinching in accordance with an exemplary embodiment of the present invention.
Figure 14:
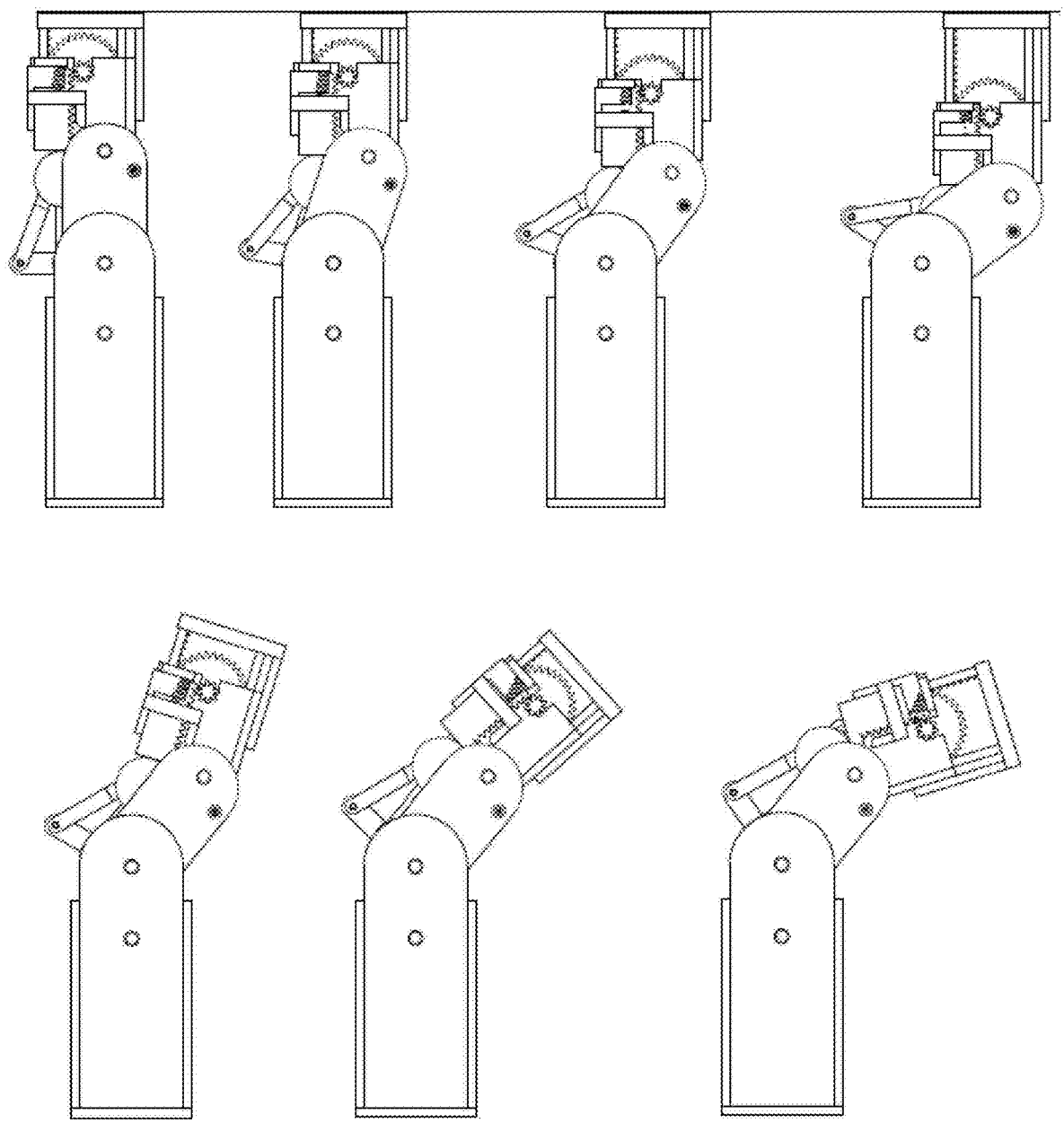
FIG. 14 shows a transition of the mechanical finger of FIG. 11 from a linearly parallel grasp mode to a self-adaptively encompassing grasp mode in accordance with an exemplary embodiment of the present invention.
Figure 15:
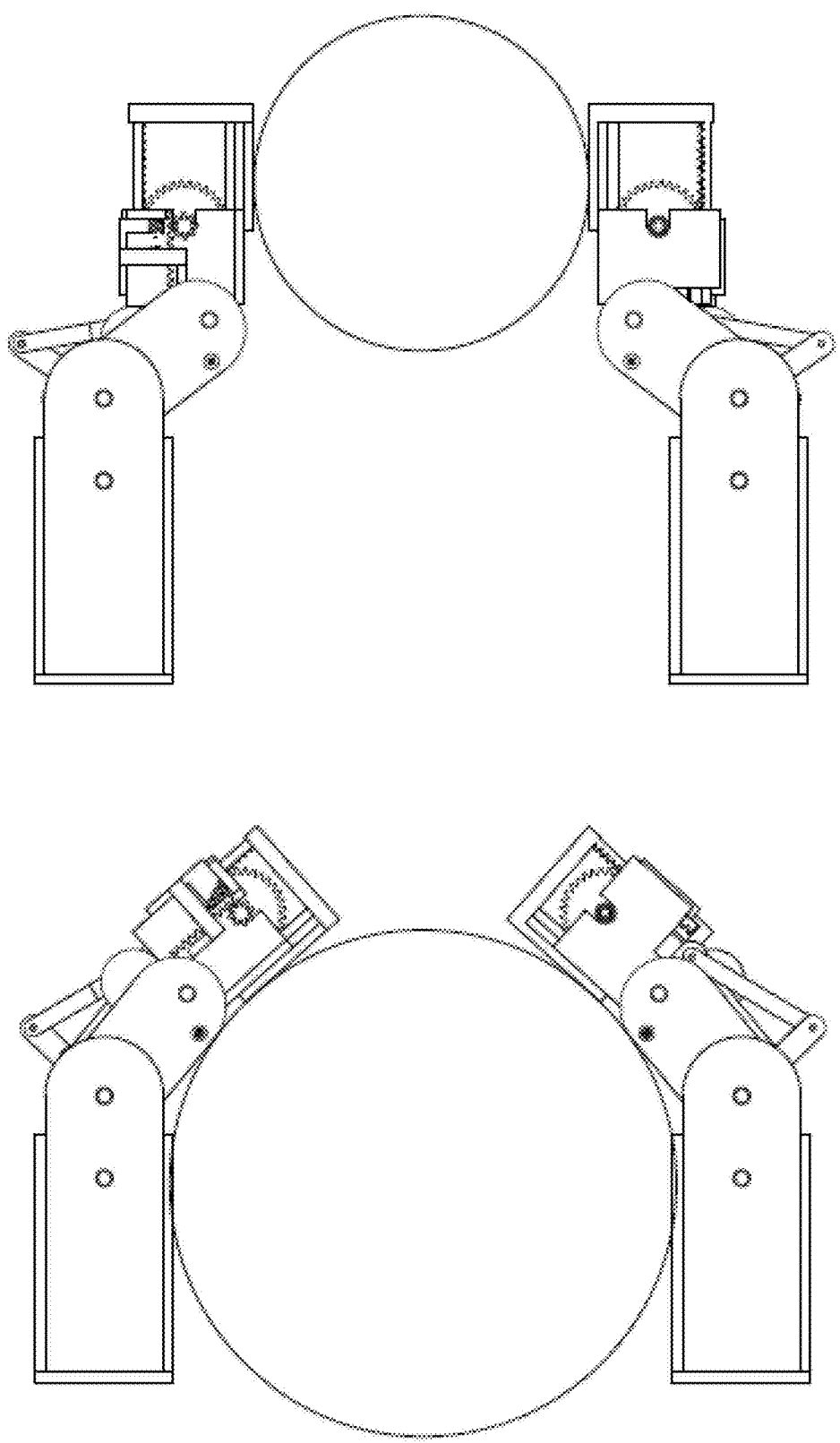
FIG. 15 depicts two mechanical fingers of FIG. 11 executing a complete parallel and a self-adaptive grasp in accordance with an exemplary embodiment of the present invention.

FIG. 13 illustrates the internal movement of the mechanical finger of FIG. 11 during a parallel pinching. FIG. 14 illustrates a transition of the mechanical finger of FIG. 11 from a linearly parallel grasp mode to a self-adaptively encompassing grasp mode. FIG. 15 illustrates two mechanical fingers of FIG. 11 executing a complete parallel (upper panel) and a self-adaptive (lower panel) grasp.

Figure 16:
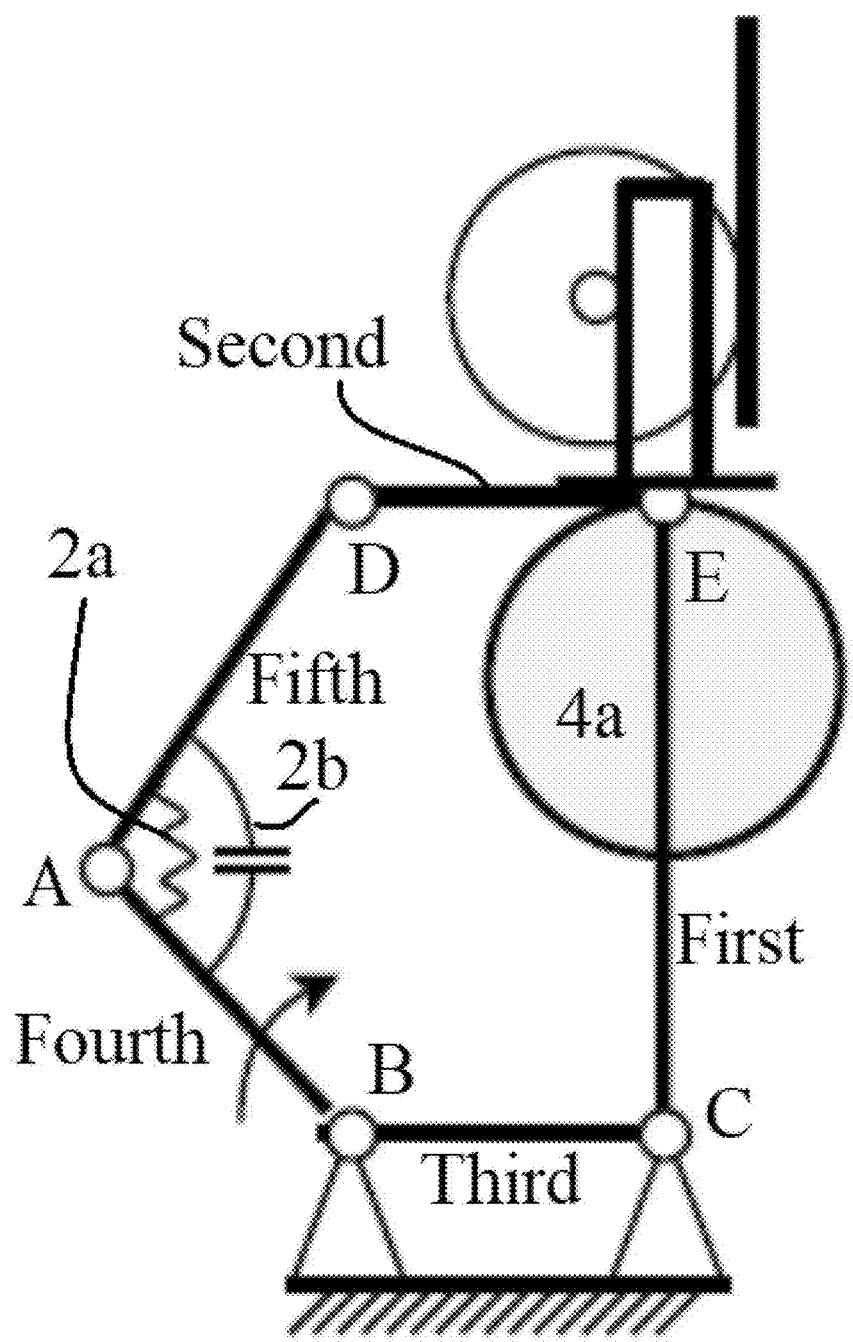
FIG. 16 shows another linkage-based mechanical finger in accordance with an exemplary embodiment of the present invention.

Many different linkage configurations can be designed according to the present invention. FIG. 16 shows an alternative linkage-based embodiment, which uses fewer linkages overall than the mechanical finger of FIG. 11. The proximal phalanx consists of five linkages and five revolute joints having a pentagon configuration. The mechanical finger in FIG. 16 is the same as that in FIG. 9A, except for the following differences. First, five revolute joints A, B, C, D and E and five (rather than 6) linkages constitute a pentagon configuration in the proximal phalanx. A first linkage CE having a proximal end near C and a distal end near E relative to the base 3. The first linkage CE is pivotally connected at its proximal end to the base 3 using a revolute joint C. A second linkage DE is pivotally connected at a first end to the distal end of the first linkage CE using a revolute joint E. A third linkage BC is pivotally connected at a first end to the proximal end of the first linkage CE using the revolute joint C. Similarly, a fourth linkage BA and a fifth linkage AD are pivotally connected to each other using a revolute joint D. The other end of the fourth linkage BA is pivotally connected to the third linkage at joint B, and the other end of the fifth linkage AD is pivotally connected to the second linkage DE at joint E. Second, spring 2a and mechanical limit 2b are placed between the fourth linkage and the fifth linkage. Third, cam 4a is fixed to the first linkage CE. Fourth, joint B becomes an active joint.

Figure 17:
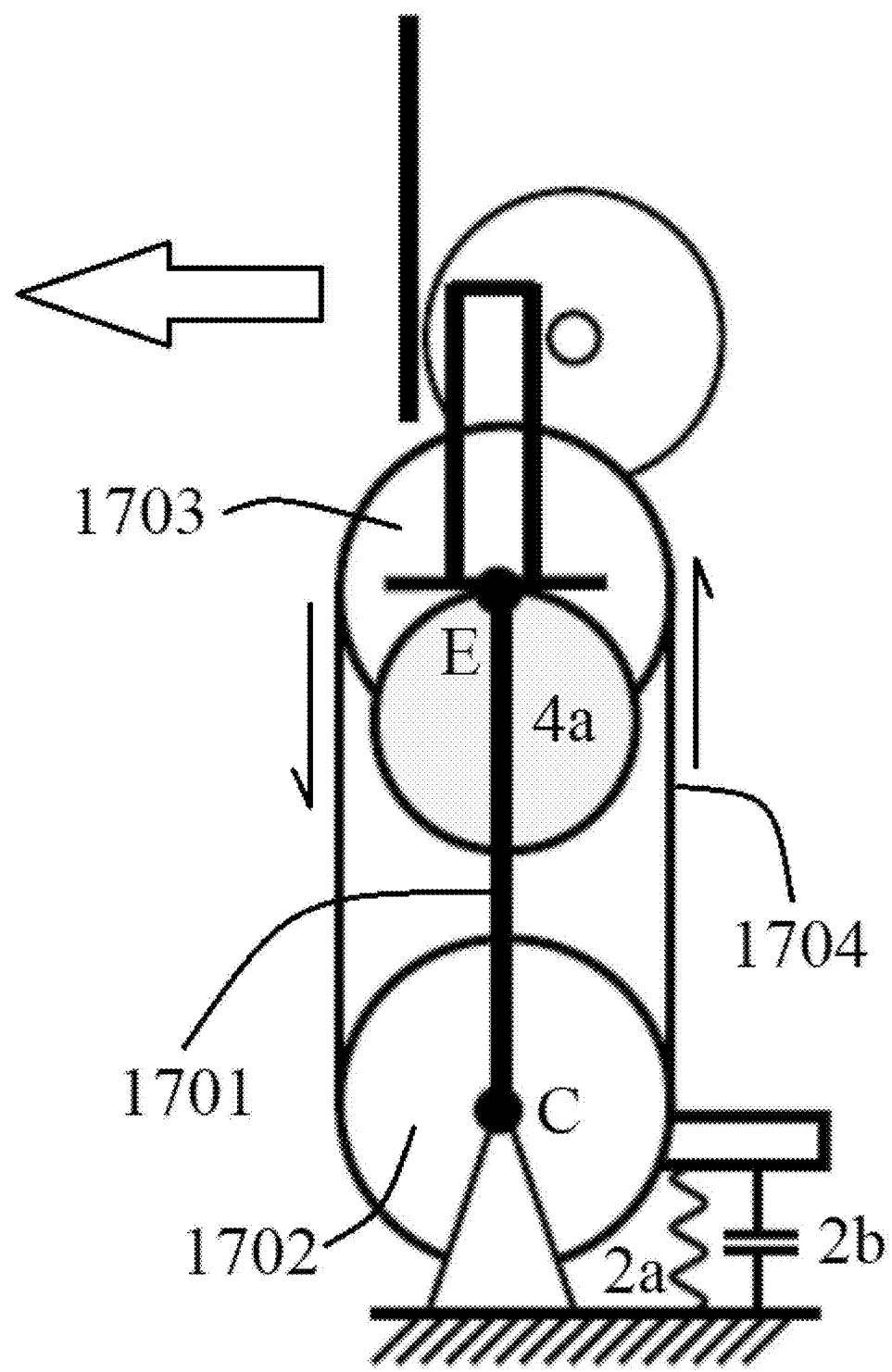
FIG. 17 shows a mechanical finger using a belt driving system in accordance with an exemplary embodiment of the present invention.

The mechanical finger in FIG. 17 is another configuration of that in FIG. 9A, using a belt drive instead of a four-bar linkage to execute the parallel motion. A linkage CE 1701 pivotally connects two revolute joints C and E (preferably in parallel to each other) located at the centers of two wheels/pulleys 1702 and 1703, respectively. A belt 1704 is a loop of flexible material, and it loops over, links, and rotates wheels 1702 and 1703. When joint C is actuated, belt 1704 drives cam-fixed linkage CE to "bend" forward (to the left). When there is a twist between two wheels/pulleys 1702 and 1703, and two revolute joints C and E need not be parallel. When the belt 1704 is crossed, the direction of the driven wheel/pulley 1703 is reversed, and linkage CE will "bend" toward the right (not shown).

Figure 18:
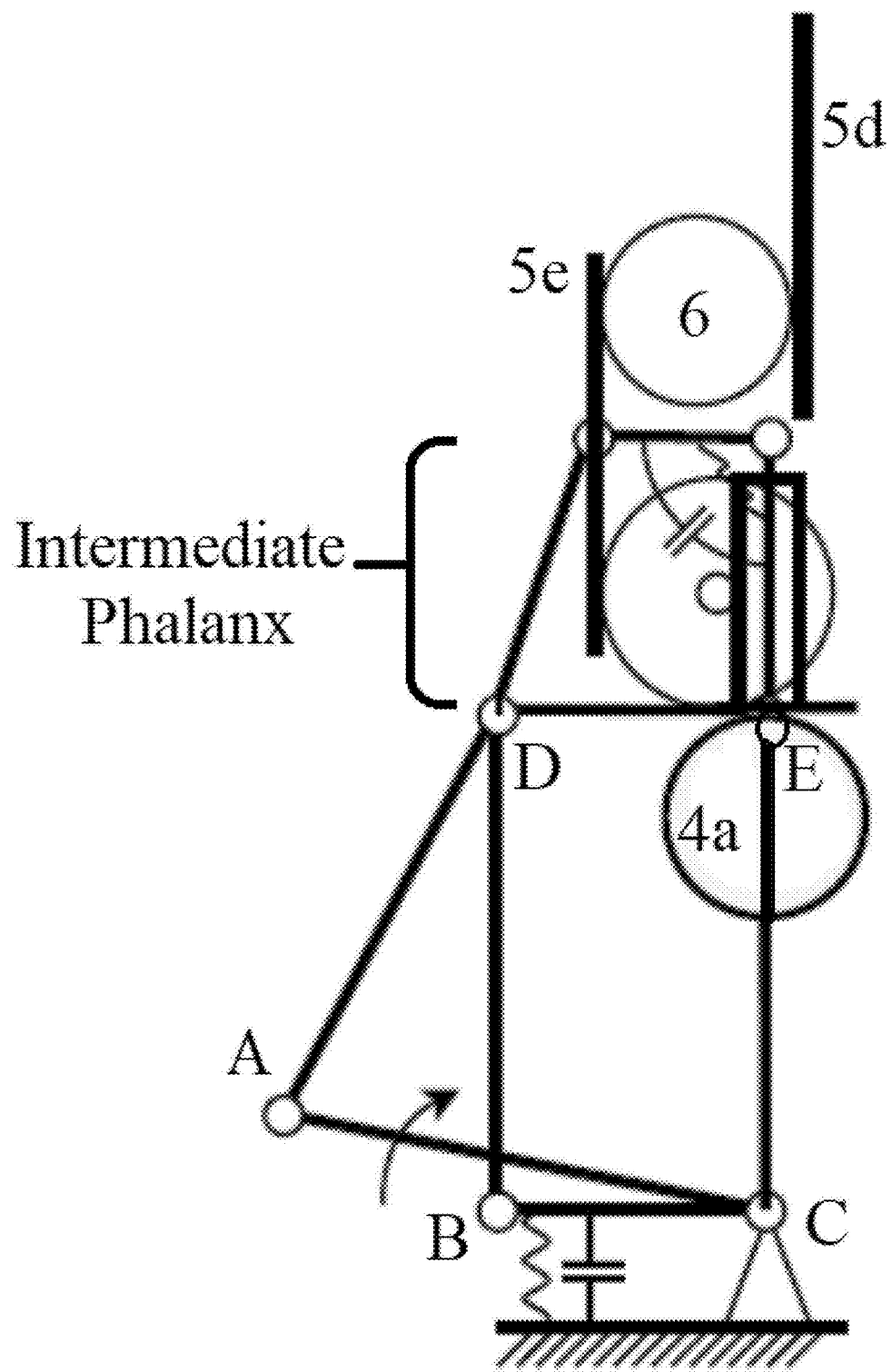
FIG. 18 schematically demonstrates a mechanical finger having more than two phalanxes in accordance with an exemplary embodiment of the present invention.

FIG. 18 schematically demonstrates a mechanical finger having more than two phalanxes, such as three phalanxes, according to an embodiment of the invention. The mechanical finger in FIG. 18 is the same as that in FIG. 9A, except for the following differences. First, an intermediate phalanx is added or inserted between the distal phalanx and the proximal phalanx. Second, cam 4a is fixed to the first linkage CE at the E end, instead of the fourth phalanx linkage BD at the D end. Third, the sub-system of concentric gears and gear racks 5 is installed with the intermediate phalanx. Fourth, a second gear system 6 is installed with the distal phalanx, between second gear rack 5e and slider 5d. In other words, second gear rack 5e and slider 5d are separated, and the motion of second gear rack 5e is translated to slider 5d through second gear system 6.

The advantages of the present invention include the following: (a) Self-adaptive fingers with compensatory displacement mechanism to enable self-adaptive linearly parallel and encompassing grasp; (b) Grasping capability within confined envelope space; (c) The design can be extended to fingers with multiple phalanxes; (d) Linearly parallel finger with extensible distal phalanx; (e) Linearly parallel finger with extensible distal phalanx with adjustable resistance that can self-adapt to grasp objects against surfaces with different softness.

In the foregoing specification, embodiments of the present invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicant to be the scope of the invention, is the literal and equivalent scope of the set of claims that issue from this application, in the specific form in which such claims issue, including any subsequent correction.

The invention claimed is:

1. A mechanical finger comprising:
a base containing an actuator,
a distal phalanx including a main body and an extensible part coupled to the main body,
one or more middle phalanxes between the base and the distal phalanx;
wherein a cam phalanx is defined as a phalanx selected from said one or more middle phalanxes, and the cam phalanx includes a linkage, onto which a cam is mounted and fixed;
wherein the cam is engaged with a cam follower, which is engaged with the extensible part;
wherein, under an actuation of the actuator, the linkage can rotate the cam, which then drives the cam follower, which then drives the extensible part to vary a spatial relationship between the extensible part and the main body,
wherein only one middle phalanx is present between the base and the distal phalanx, and the proximal phalanx comprises a closed loop linkage assembly; and
wherein the proximal phalanx includes:
a first linkage CE having a proximal end and a distal end relative to the base, wherein the first linkage CE is pivotally connected at its proximal end to the base using a revolute joint C;
a second linkage DE being pivotally connected at a first end to the distal end of the first linkage CE using a revolute joint E;
a third linkage BC being pivotally connected at a first end to the proximal end of the first linkage CE using the revolute joint C;
a fourth linkage BD being pivotally connected at a first end to a second end of the second linkage DE using a revolute joint D, and being pivotally connected at a second end to a second end of the third linkage BC using a revolute joint B;
a fifth linkage AC having a proximal end and a distal end relative to the base, wherein the fifth linkage AC is pivotally connected at its proximal end to the base using the revolute joint C; and
a sixth linkage AD being pivotally connected at a first end to the fifth linkage AC using a revolute joint A, and being pivotally connected at a second end to the second linkage DE and the fourth linkage BD using the revolute joint D:
wherein the actuator can actuate the fifth linkage AC revolve or pivot about revolute joint C; and
wherein the cam is fixed onto the first end of fourth linkage BD, and revolves or pivots about revolute joint D.

2. The mechanical finger according to claim 1, wherein the distance between revolute joint D and revolute joint E equals to the distance between revolute joint B and revolute joint C; and the distance between revolute joint D and revolute joint B equals to the distance between revolute joint E and revolute joint C.

3. The mechanical finger according to claim 2, wherein the cam follower is driven by the cam to a first direction, and driven by the follower's gravity, a resilient member, or any combination thereof to a second direction that is different from the first direction.

4. The mechanical finger according to claim 3, wherein the cam follower drives the extensible part using a gear system, a belt system, tendons, bars, or any combination thereof.

5. The mechanical finger according to claim 4, wherein the cam is a circularly-shaped cam, and revolves about a cam point that is near or on the cam's circumference; and wherein the fourth linkage BD is configured to pass both the cam point and the center of said circularly-shaped cam.

6. The mechanical finger according to claim 5, wherein pivot axes of said revolute joints A, B, C, D and E are parallel to each other.

7. The mechanical finger according to claim 6, further comprising a spring and a mechanical limit between the third linkage BC and the base.

8. The mechanical finger according to claim 7, wherein the cam drives the cam follower, which then drives the extensible part using a first gear rack, and a small gear and a large gear that are fixed on a same shaft.

9. The mechanical finger according to claim 8, wherein the cam has a radius r, when it spins an angle θ, the cam follower travels a distance r−r cos θ; wherein the first gear rack is attached to the cam follower and used to rotate the small gear and the large gear on the same shaft; wherein the larger gear moves a second gear rack in the extensible part a compensatory displacement Δh=pr−pr cos θ, where p is the ratio between the diameters of the larger and smaller gears.

10. The mechanical finger according to claim 9, wherein value p is set so that the compensatory displacement Δh is equal to, and therefore cancels off, a gap distance or height variation Δs of the main body of the distal phalanx during parallel pinching.

11. A mechanical gripper comprising one or more mechanical fingers of claim 1.

12. The mechanical gripper according to claim 11, which comprises a pair of the fingers used in combination.

13. The mechanical gripper according to claim 12, wherein a closing sequence occurs with a continuous motion of the actuator.

14. The mechanical gripper according to claim 13, wherein the distal phalanxes remain perpendicular to the base for parallel pinching until a load is applied to the proximal phalanxes to trigger automatic self-adaptive encompassing.

15. A robot comprising a mechanical gripper of claim 11.

* * * * *